(12) United States Patent
Koslu

(10) Patent No.: US 11,107,013 B2
(45) Date of Patent: Aug. 31, 2021

(54) PROGRAMMATICALLY ALLOCATING VENUE CAPACITY BASED ON DISTANCING REQUIREMENTS

(71) Applicant: Dogan Koslu, El Segundo, CA (US)

(72) Inventor: Dogan Koslu, El Segundo, CA (US)

(*) Notice: Subject to any disclaimer, the term of this patent is extended or adjusted under 35 U.S.C. 154(b) by 0 days.

(21) Appl. No.: 17/024,453

(22) Filed: Sep. 17, 2020

(65) Prior Publication Data

US 2021/0004730 A1 Jan. 7, 2021

Related U.S. Application Data

(63) Continuation of application No. 16/900,590, filed on Jun. 12, 2020.

(60) Provisional application No. 62/992,915, filed on Mar. 21, 2020.

(51) Int. Cl.
*G06Q 10/02* (2012.01)
*G06Q 10/04* (2012.01)
*G06F 16/901* (2019.01)
*G06F 16/9035* (2019.01)
*G06F 16/906* (2019.01)

(52) U.S. Cl.
CPC .......... *G06Q 10/02* (2013.01); *G06F 16/906* (2019.01); *G06F 16/9017* (2019.01); *G06F 16/9035* (2019.01); *G06Q 10/04* (2013.01)

(58) Field of Classification Search
CPC ...... G06Q 10/02; G06Q 10/04; G06F 16/906; G06F 16/9035; G06F 16/9017
See application file for complete search history.

(56) References Cited

U.S. PATENT DOCUMENTS

| 10,915,231 | B1* | 2/2021 | Bacon | G06Q 30/018 |
| 2012/0010913 | A1* | 1/2012 | Lele | G06Q 10/02 705/5 |
| 2020/0090081 | A1* | 3/2020 | Sunshine | G06Q 30/0283 |

FOREIGN PATENT DOCUMENTS

WO   WO-2019/084605 A1   5/2019

OTHER PUBLICATIONS

International Search Report and Written Opinion for PCT/US2021/023157 (ISA/EP) dated Jul. 12, 2021 (11 pages).

\* cited by examiner

*Primary Examiner* — Mark D Featherstone
*Assistant Examiner* — Faezeh Forouharnejad
(74) *Attorney, Agent, or Firm* — Alston & Bird LLP

(57) ABSTRACT

Provided are methods, systems, and apparatuses for automatically allocating physical units of a physical space. In example embodiments, an allocation request is received from a first computing device. The allocation request includes a physical space identifier, a physical unit quantity, and a physical unit arrangement type. A plurality of possible physical unit allocation subsets matching the allocation request are retrieved from a physical space repository and based on a physical unit allocation regulation associated with the physical space identifier. A physical unit allocation interface including one or more of the possible physical unit allocation subsets is transmitted to the first computing device. Available physical units associated with the physical space identifier are transformed in the physical space repository to unavailable physical units. The unavailable physical units include first physical units allocated for physical use by a physical being as well as second physical units allocated to remain unused by physical beings according to the physical unit allocation regulation.

20 Claims, 44 Drawing Sheets

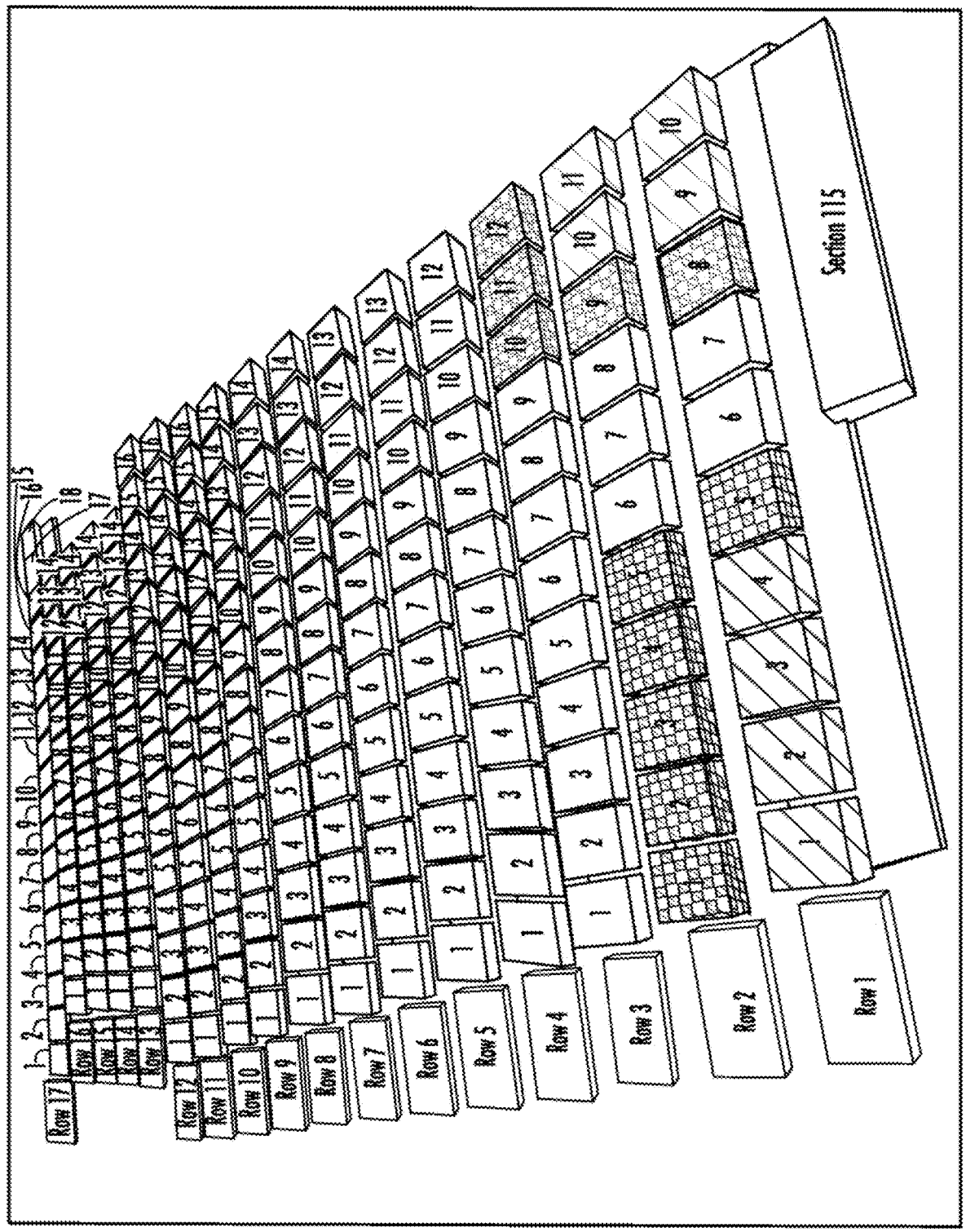

PROGRAMMATICALLY ALLOCATING VENUE CAPACITY BASED ON DISTANCING REQUIREMENTS

CROSS-REFERENCE TO RELATED APPLICATIONS

The present application is a continuation of U.S. patent application Ser. No. 16/900,590, filed on Jun. 12, 2020, which claims priority to U.S. Provisional Application Ser. No. 62/992,915, titled "THE SAFE SEATING ALGORITHM: A SYSTEM FOR RESERVING SEATS IN A VENUE WHILE MAINTAINING SOCIAL ISOLATION BETWEEN GROUPS OF PEOPLE," filed Mar. 21, 2020, the contents of which are incorporated herein by reference in their entirety.

FIELD

The present application is generally related to programmatic provisioning of physical units of a venue, and, more particularly, to a system, method, and computer-readable storage medium storing computer-executable instructions for programmatically allocating venue capacity based on distancing requirements.

BACKGROUND

Online seating reservation systems enable customers to purchase tickets for assigned seats within a venue for a performance or event. Existing online reservation systems allow customers to select their own seats, but do not enable customers to control if or how many other customers are seated near or next to them.

When seats are already assigned to other customers, and therefore are unavailable, existing online reservation systems will prevent those seats from being presented for selection to subsequent customers. However, existing online reservation systems are not capable of automatically and dynamically updating an inventory of available seats according to a desired (or even legally required) distance to be maintained between groups of people.

For example, during or after a global pandemic, government regulations may dictate that groups of people must remain at least a certain distance from each other (e.g., 6 feet or more) in order to prevent or slow the spread of a particular pathogen. Moreover, even in the absence of government regulations dictating such required social distancing, customers may prefer to visit only those venues enforcing safe distancing between groups of people. Existing online reservation systems are not capable of automatically enforcing such regulations or requirements in their seating assignments.

Accordingly, there is a need for systems and methods for programmatically allocating venue capacity based on distancing requirements.

SUMMARY

Embodiments of the present disclosure are directed to automatically allocating physical units of a physical space. In example embodiments, an allocation request is received from a first computing device. The allocation request includes a physical space identifier, a physical unit quantity, and a physical unit arrangement type. A plurality of possible physical unit allocation subsets matching the allocation request are retrieved from a physical space repository and based on a physical unit allocation regulation associated with the physical space identifier. A physical unit allocation interface including one or more of the possible physical unit allocation subsets is transmitted to the first computing device. Available physical units associated with the physical space identifier are transformed in the physical space repository to unavailable physical units. The unavailable physical units include first physical units allocated for physical use by a physical being as well as second physical units allocated to remain unused by physical beings according to the physical unit allocation regulation.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
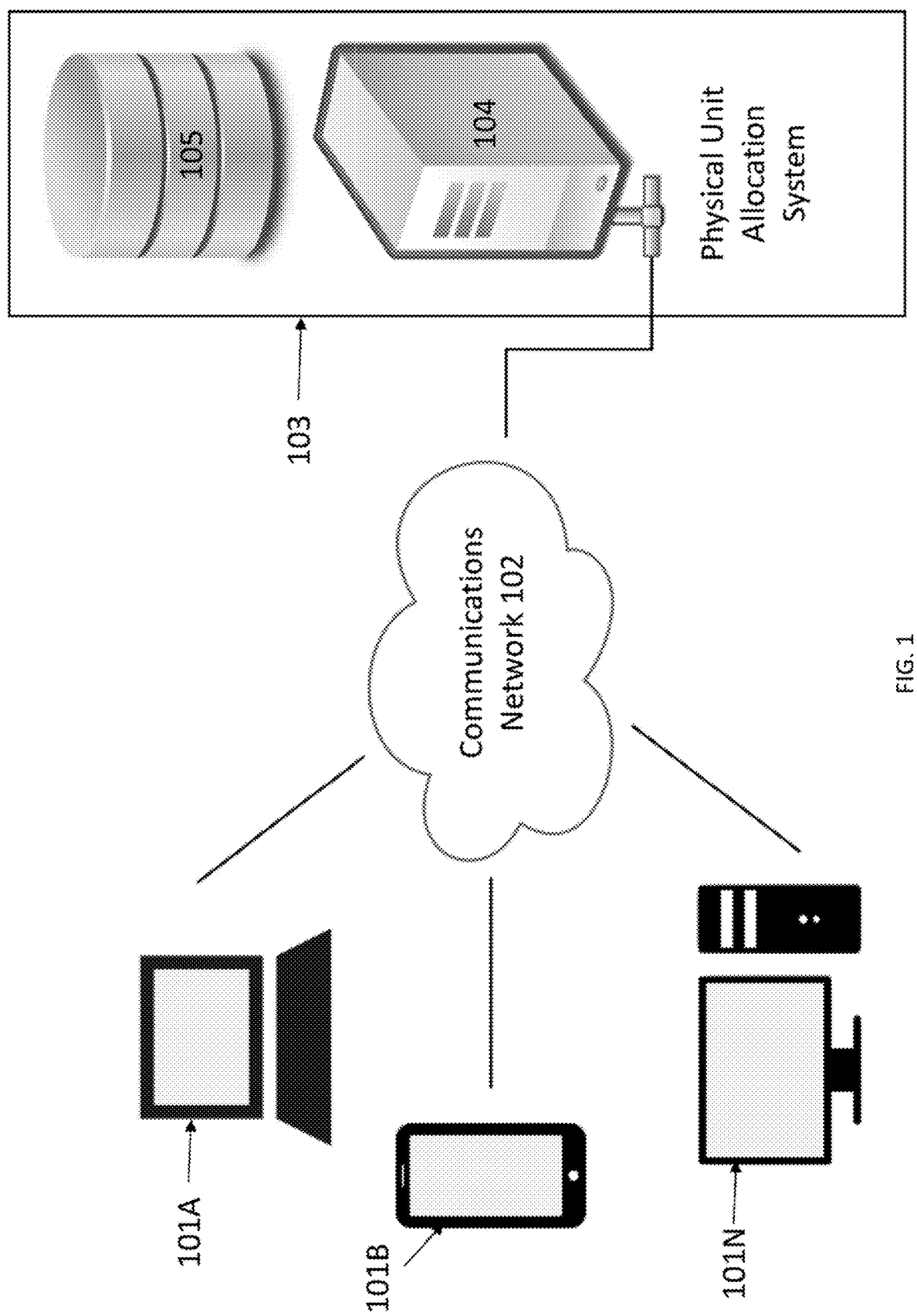
Figure 2:
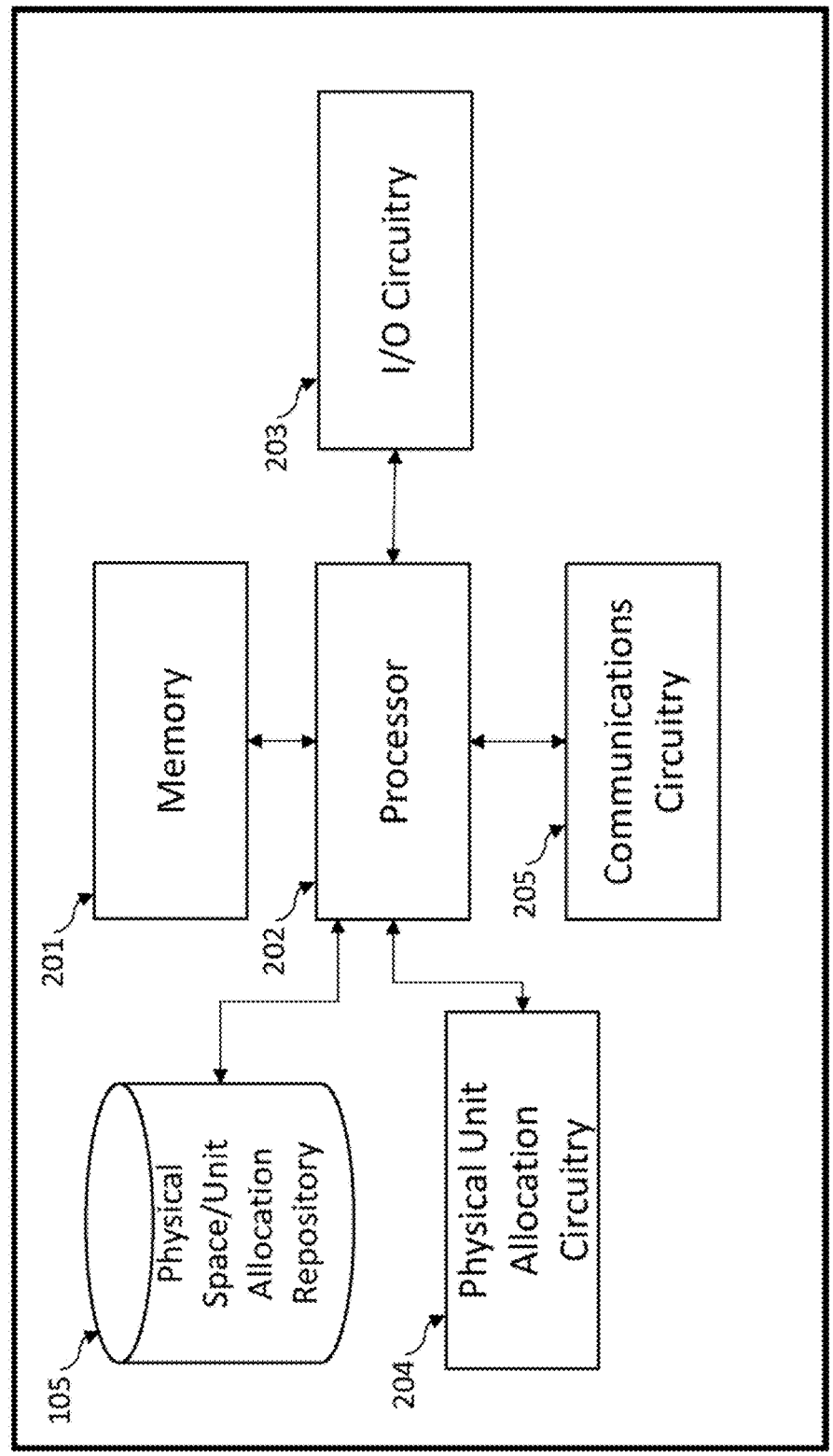
Figure 3:
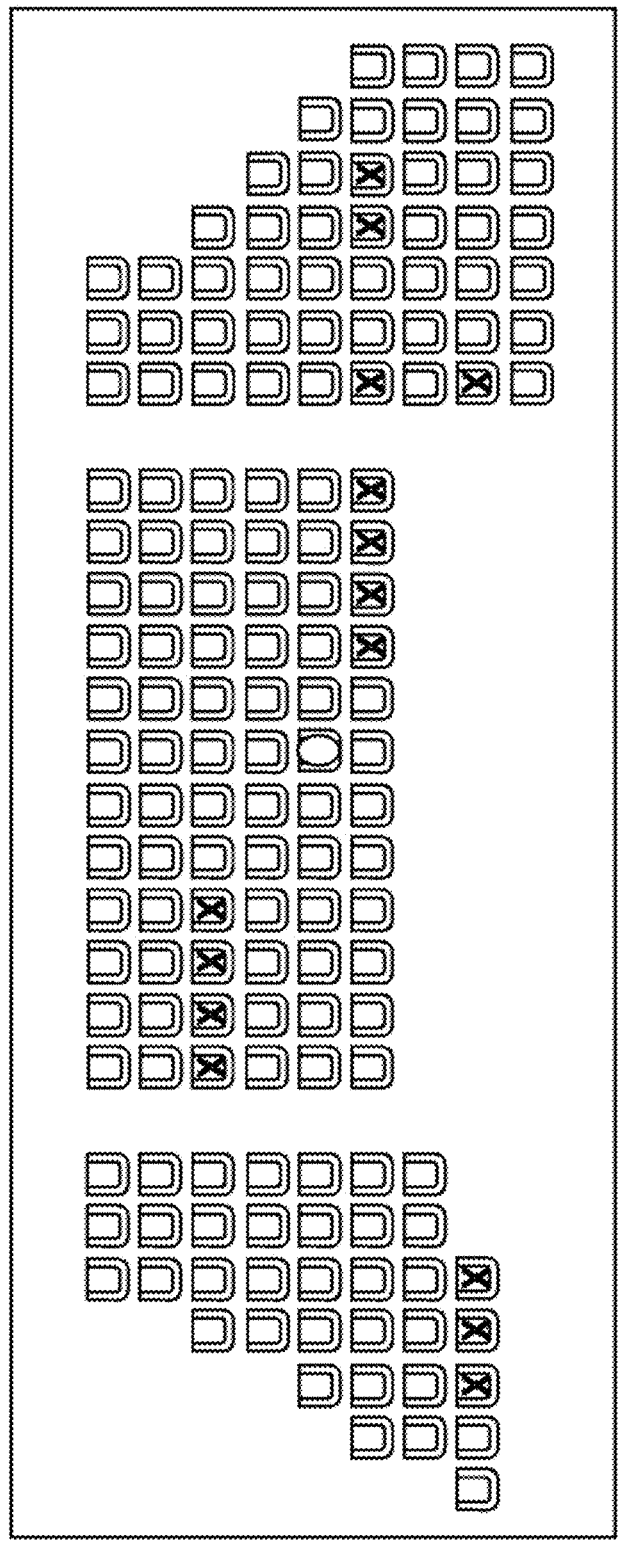
Figure 4:
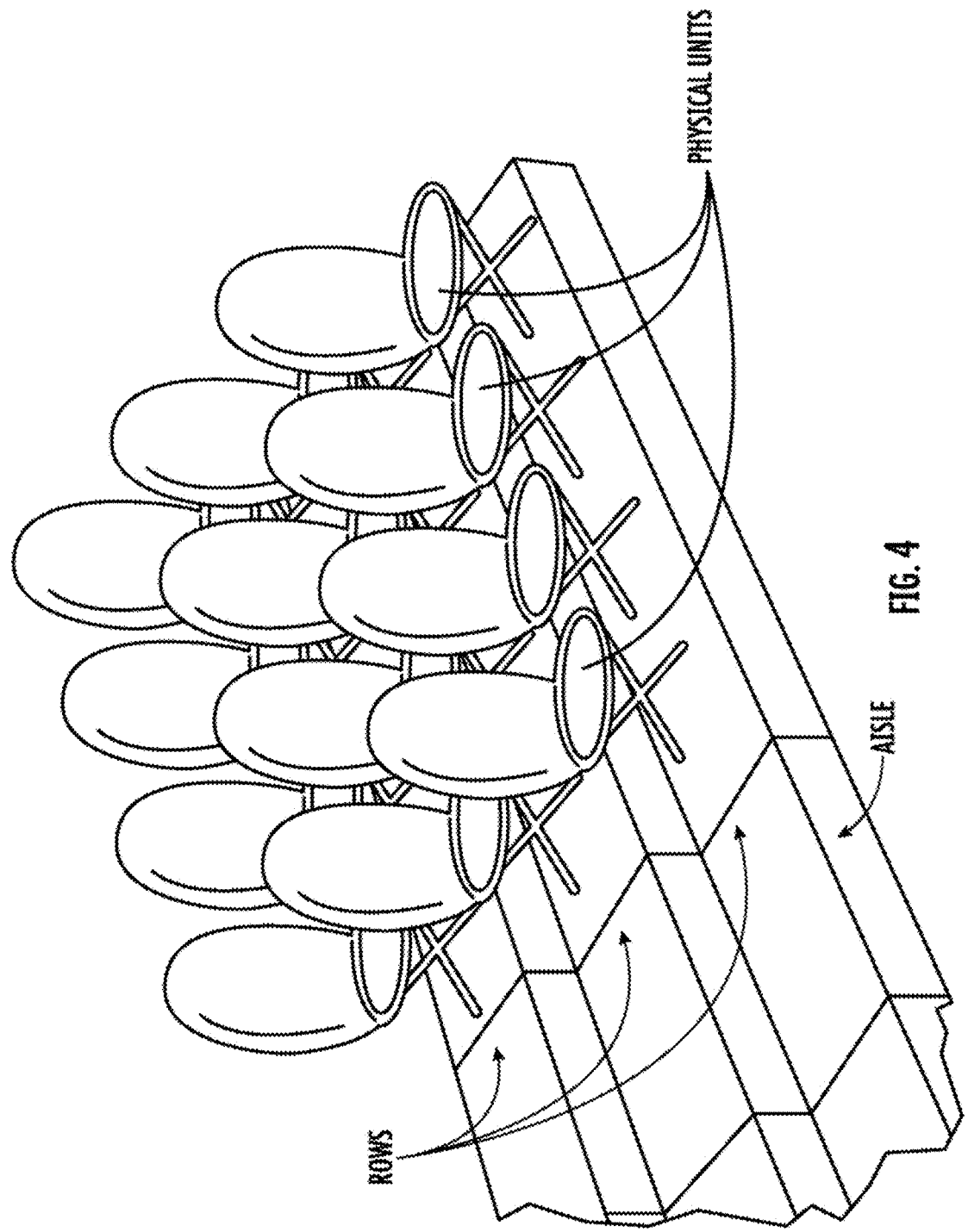
Figure 5:
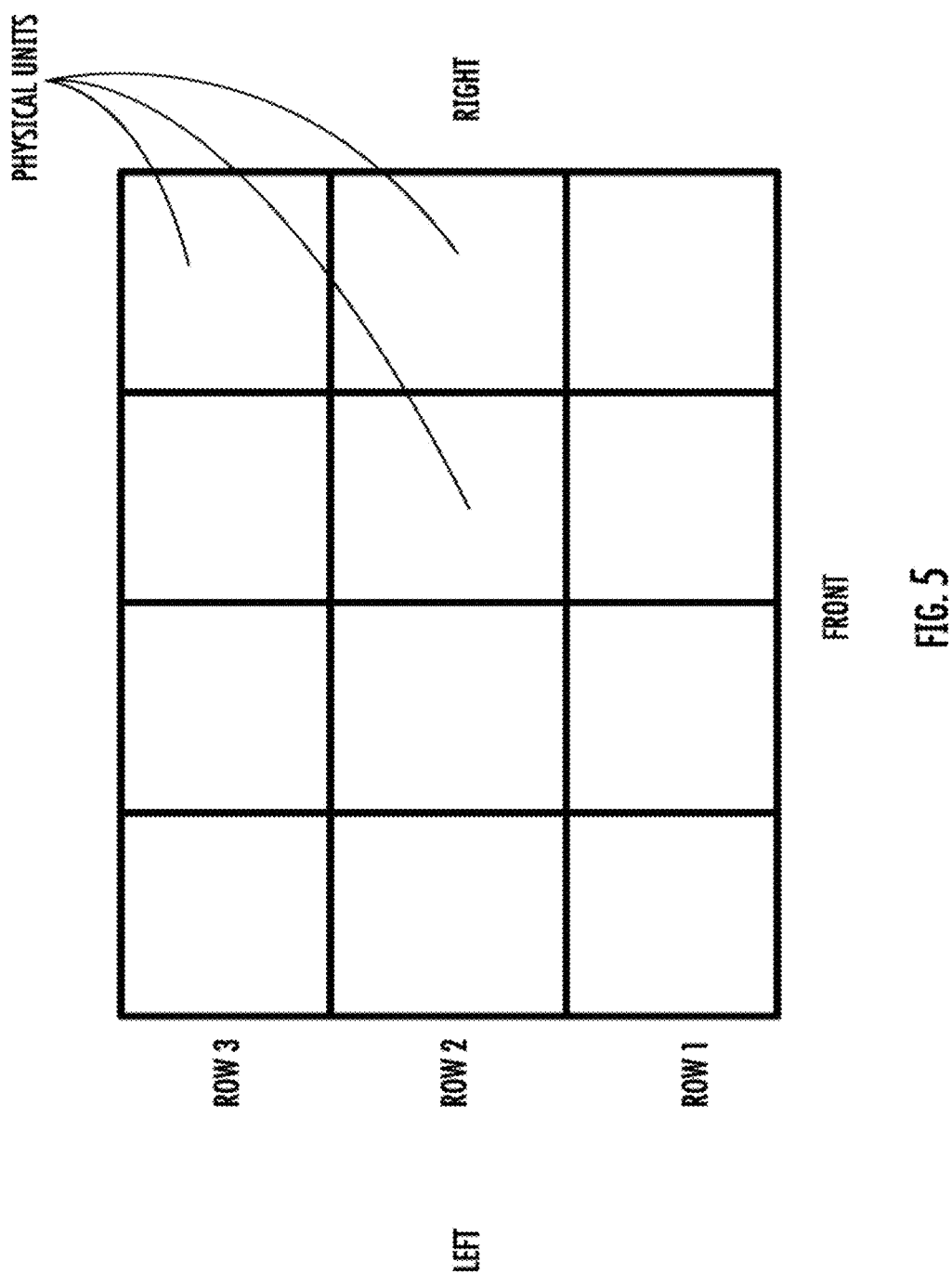
Figure 6A:
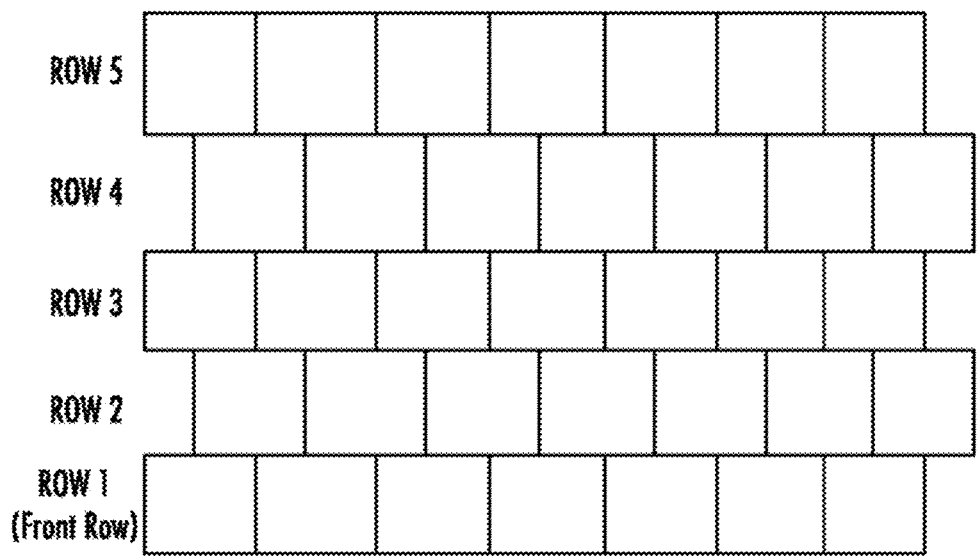
Figure 6B:
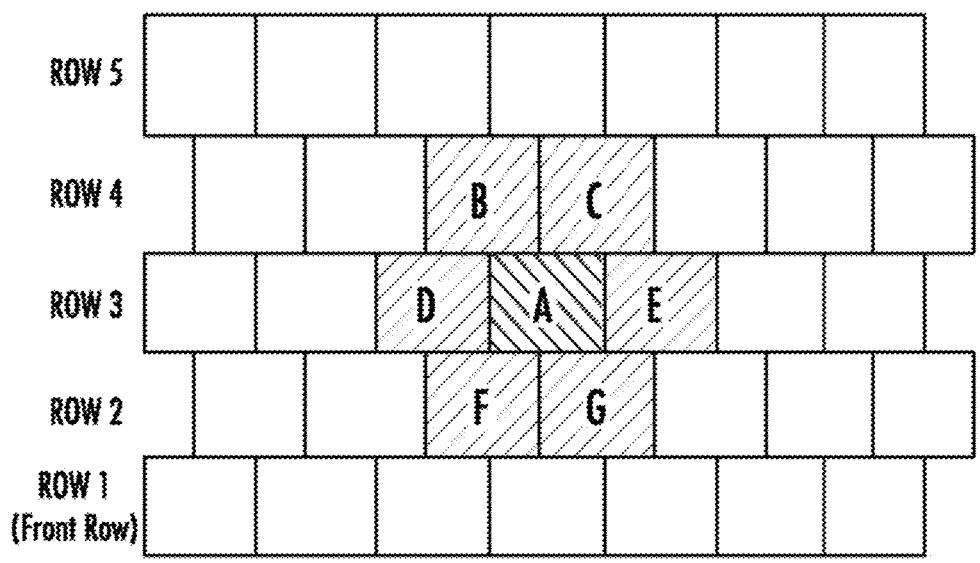
Figure 7A:
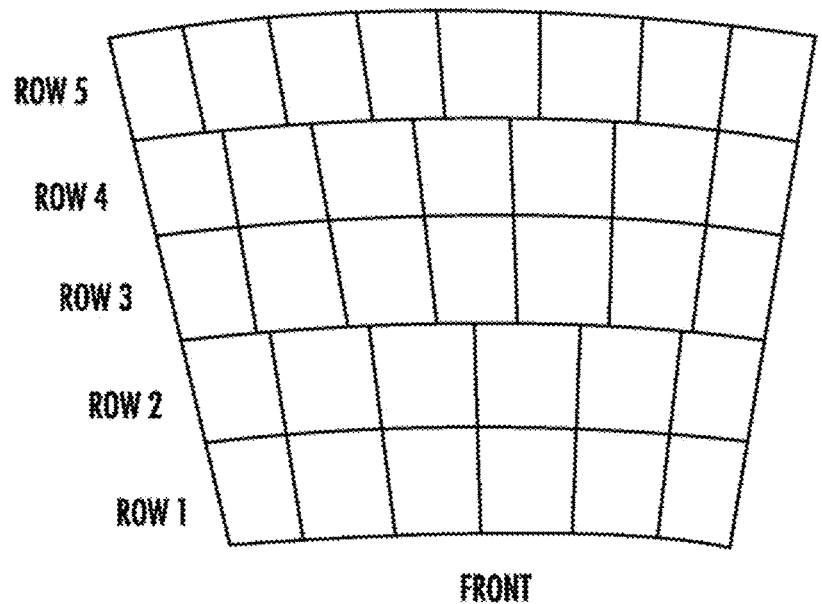
Figure 7B:
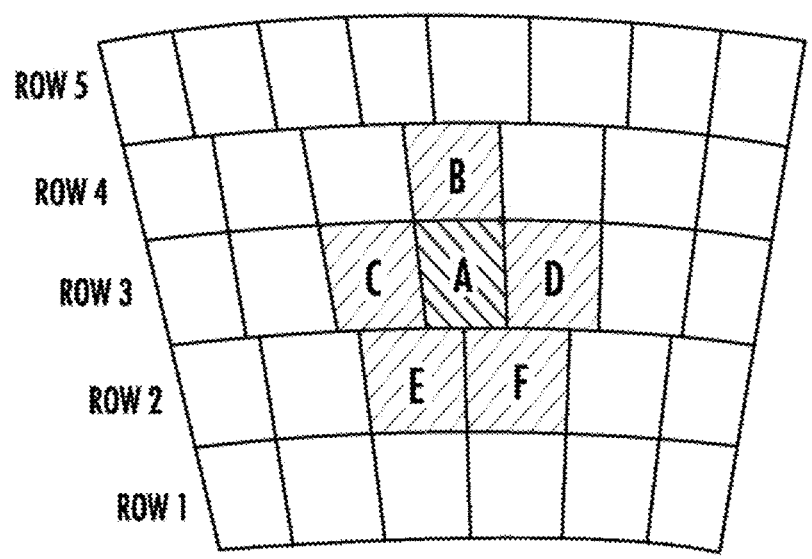
Figure 9A:
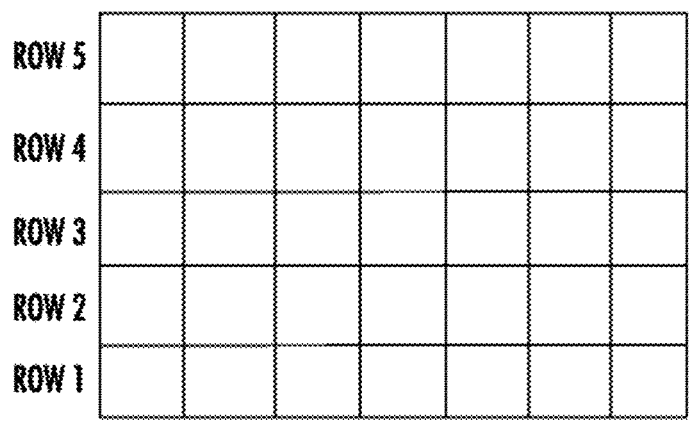
Figure 9B:
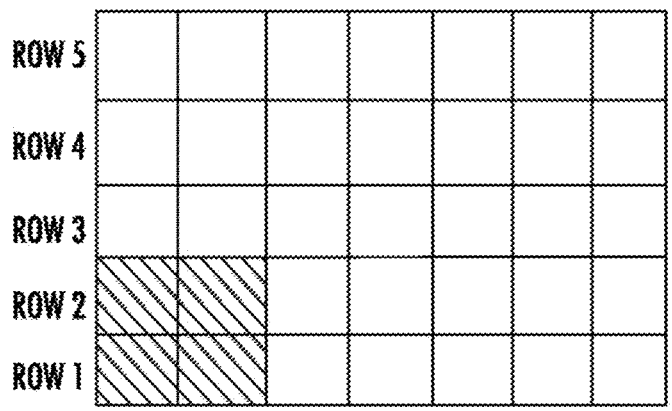
Figure 9C:
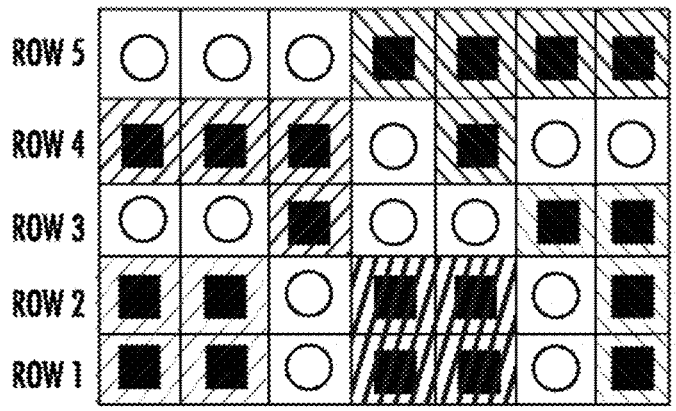
Figure 10A:
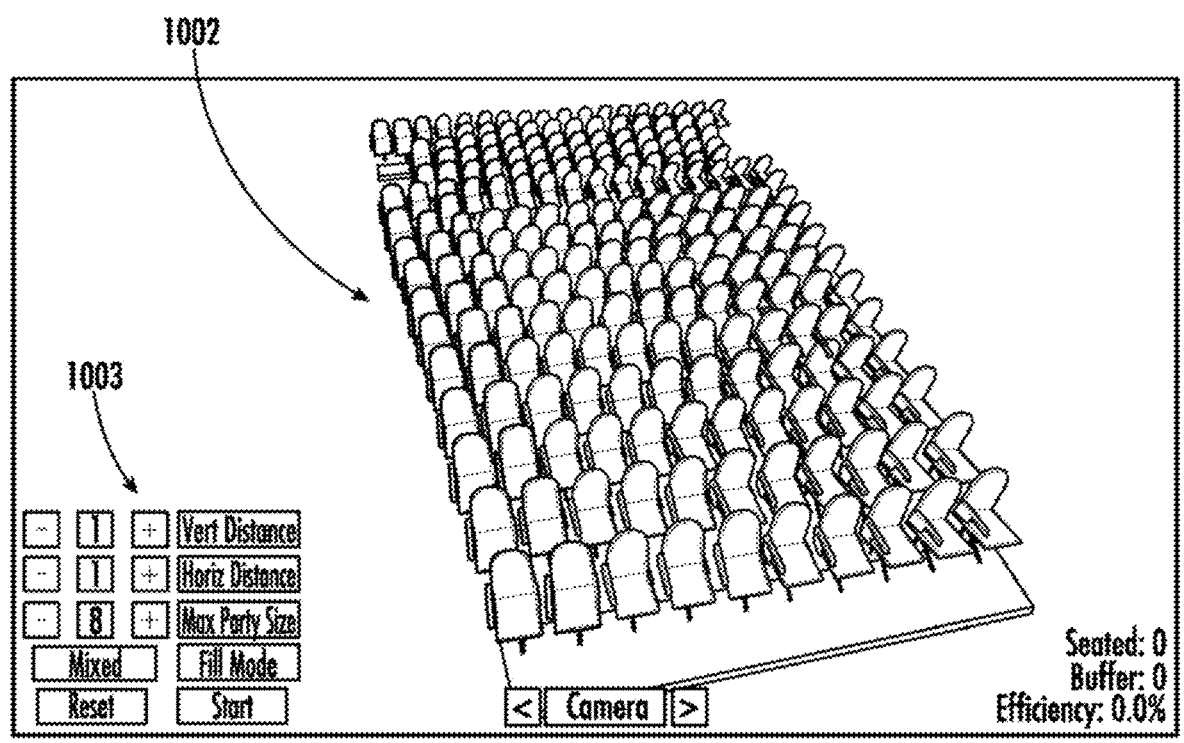
Figure 10B:
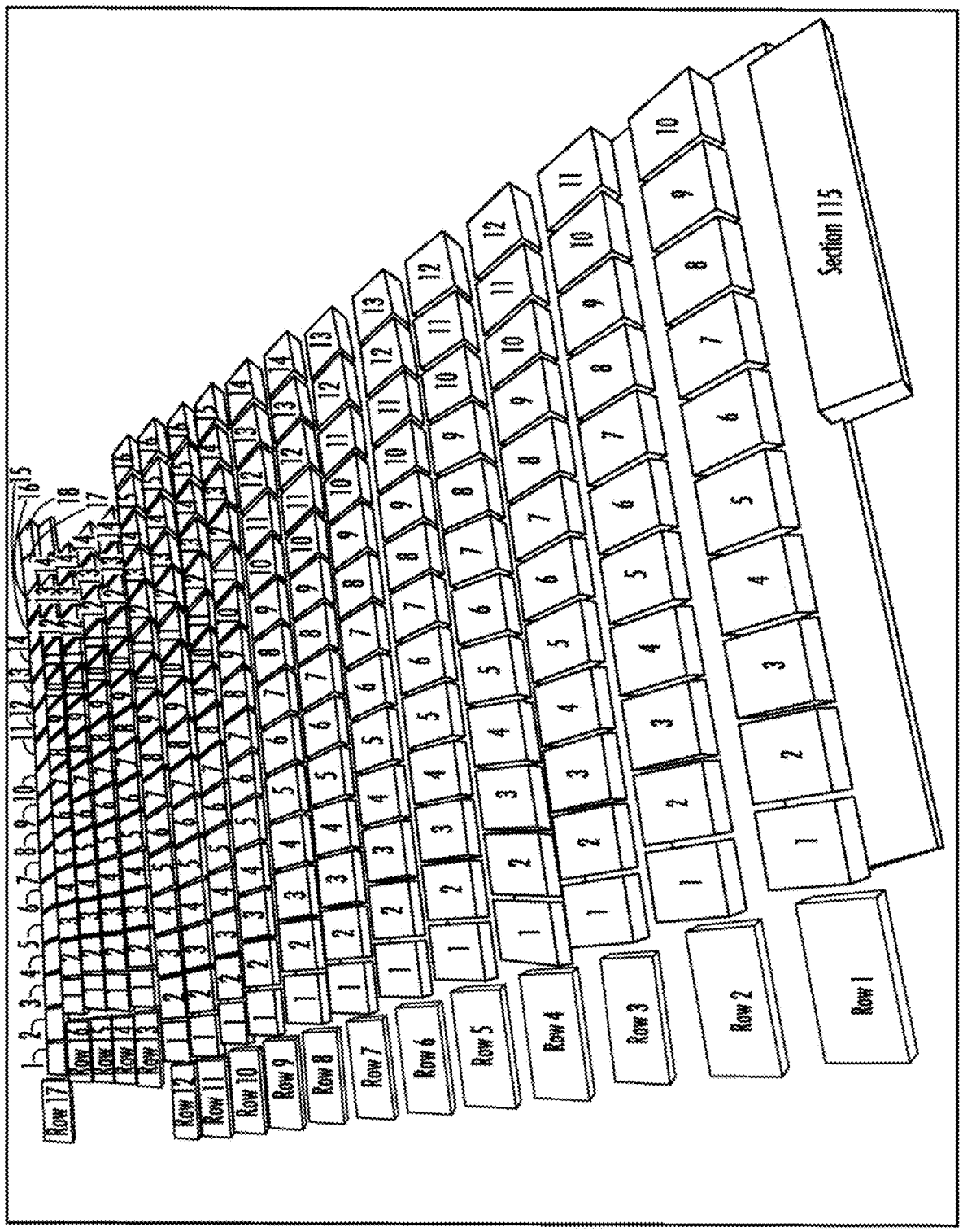
Figure 10C:
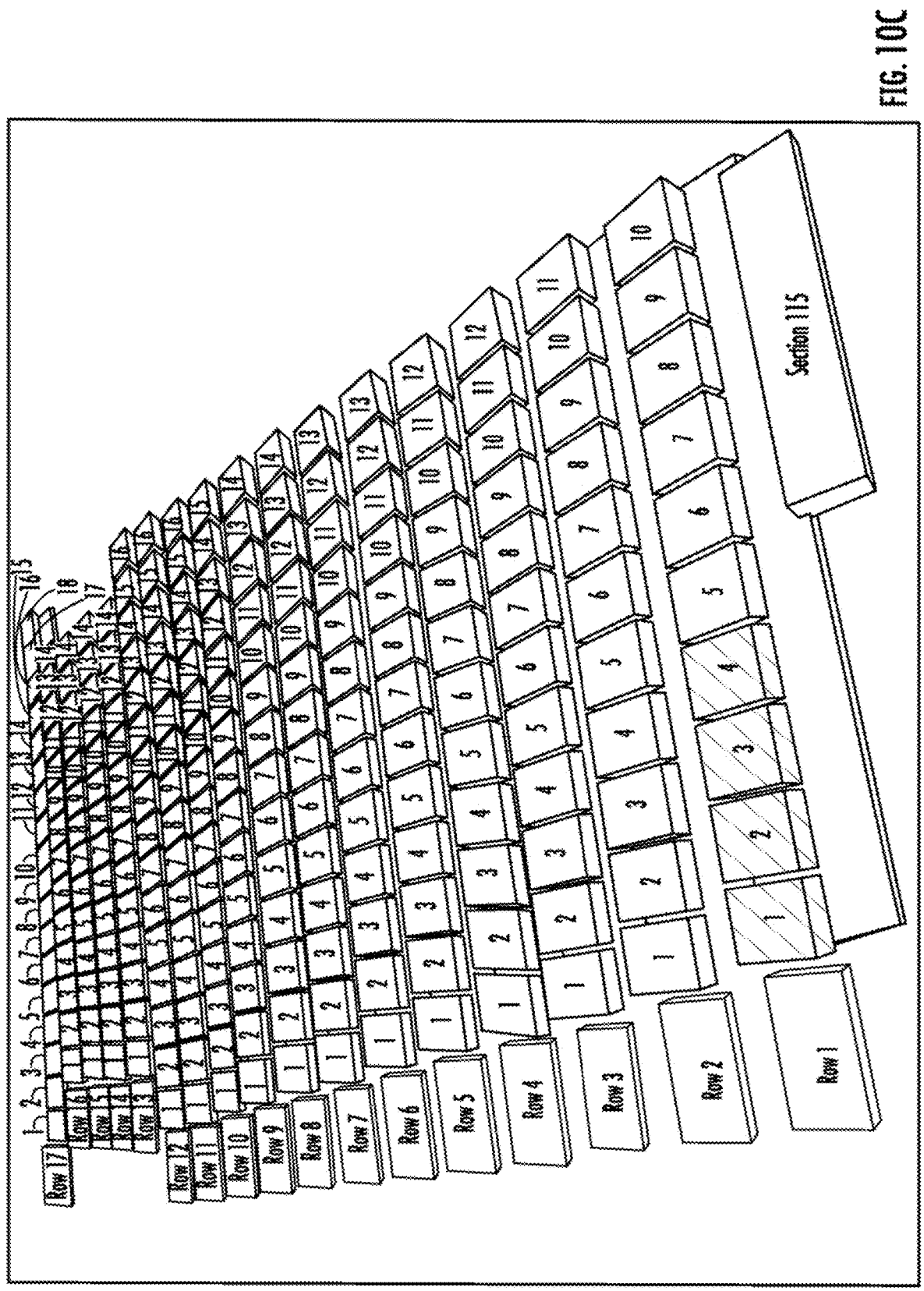
Figure 10D:
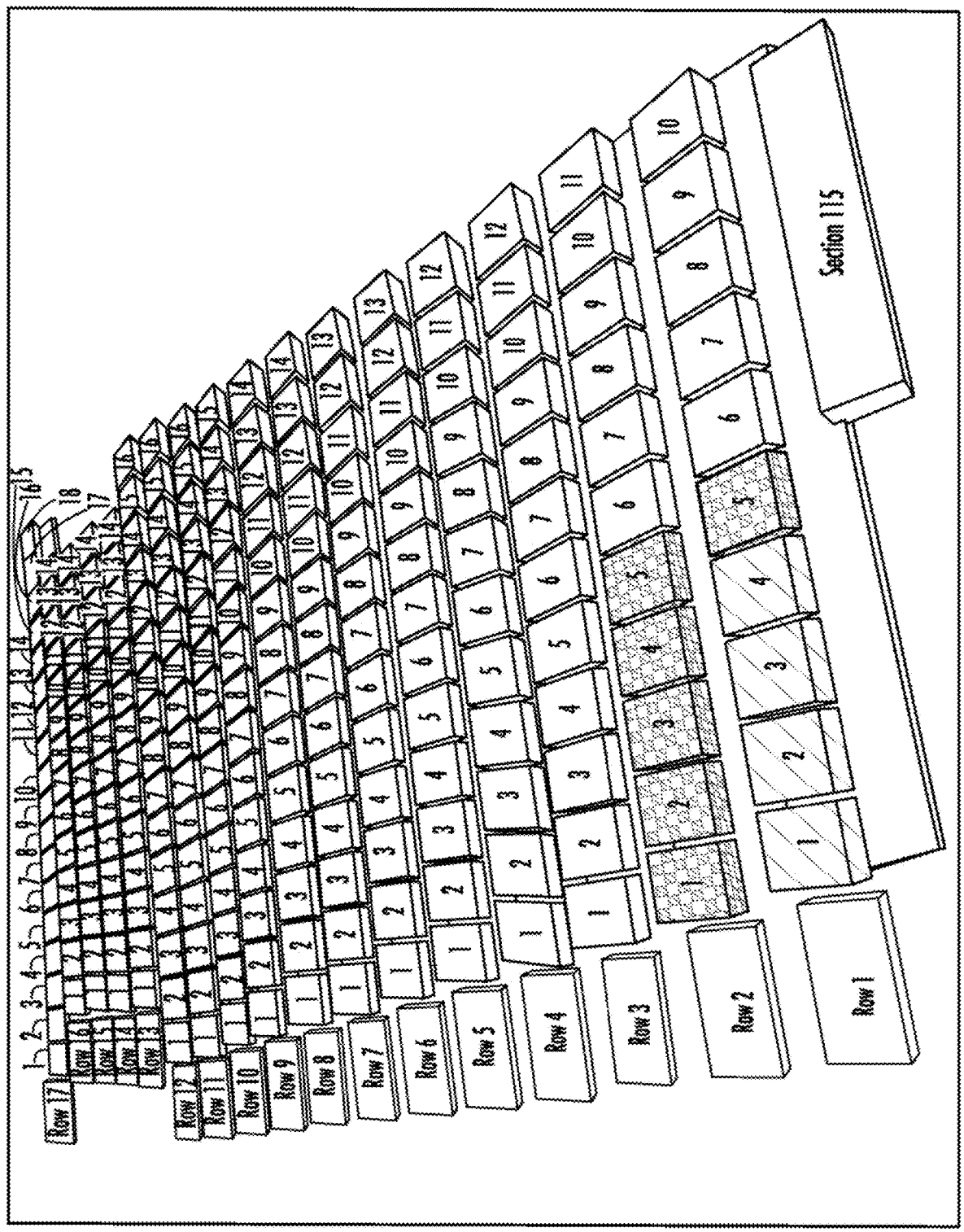
Figure 10E:
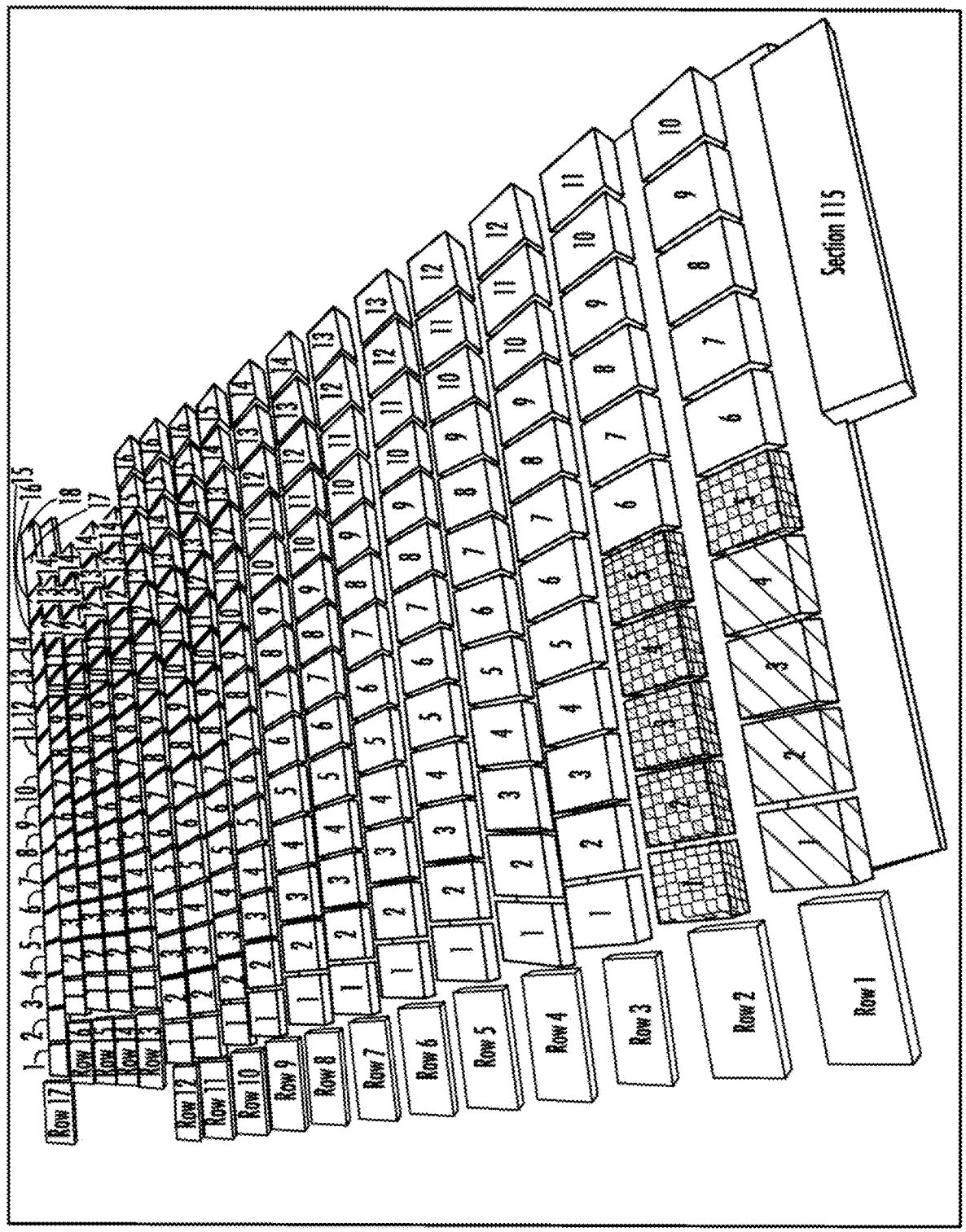
Figure 10F:
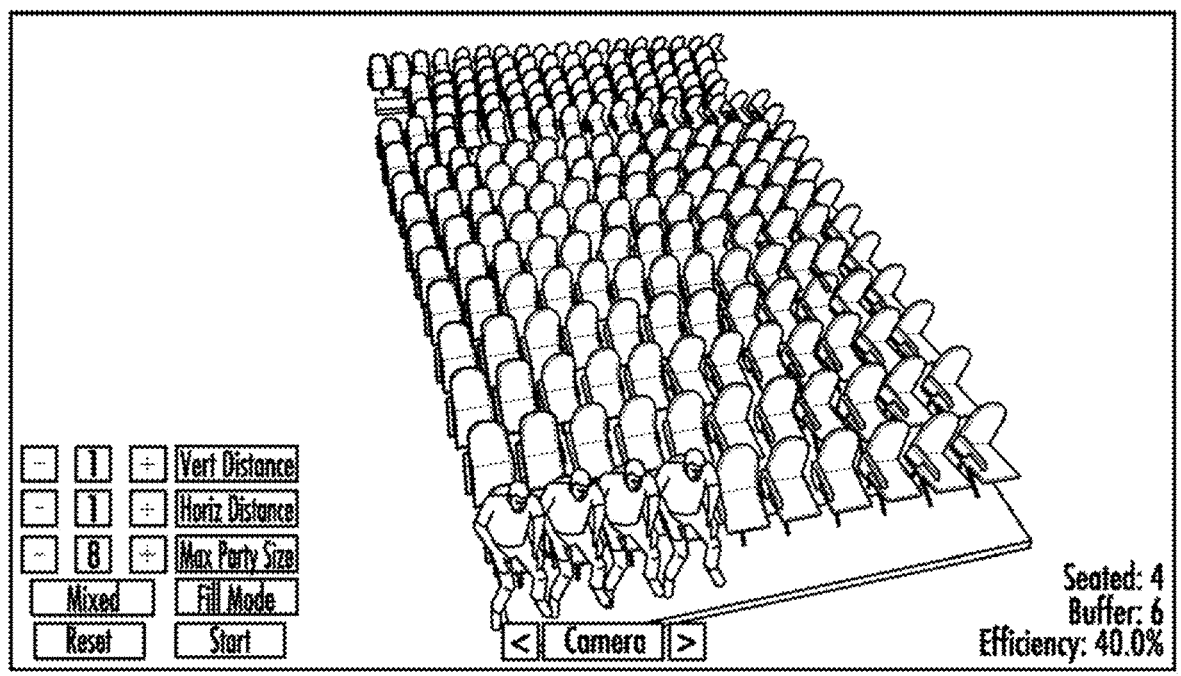
Figure 10G:
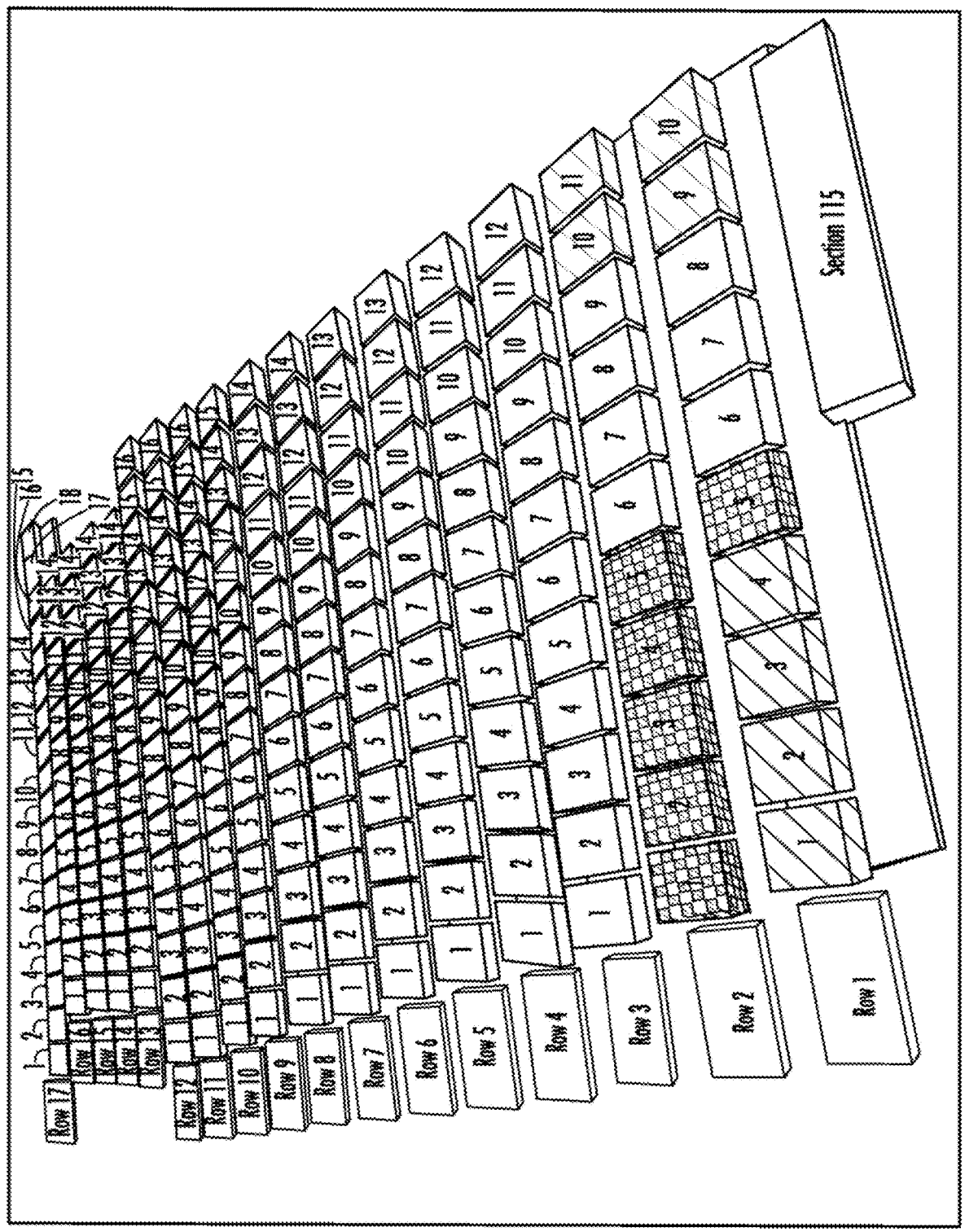
Figure 10I:
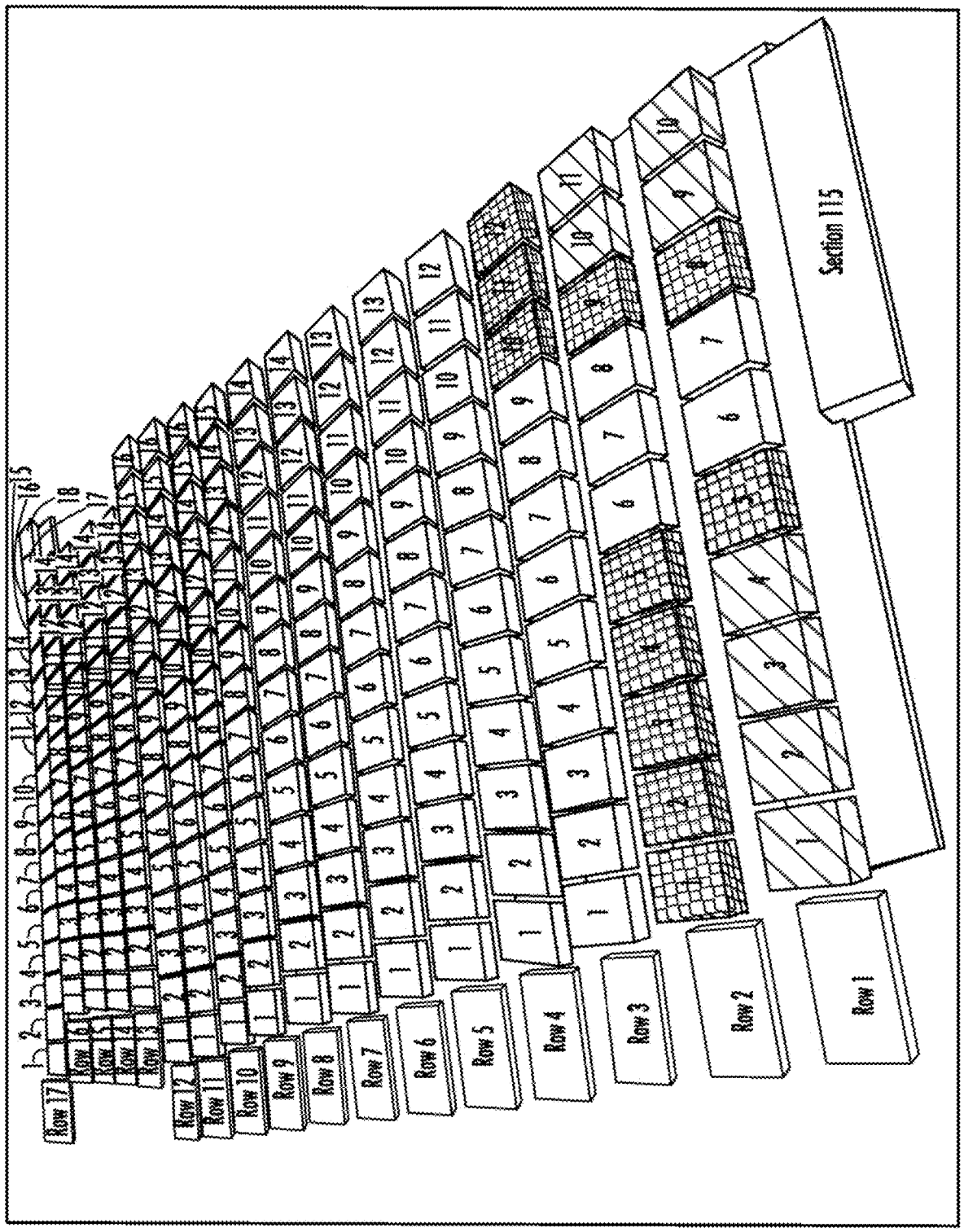
Figure 10J:
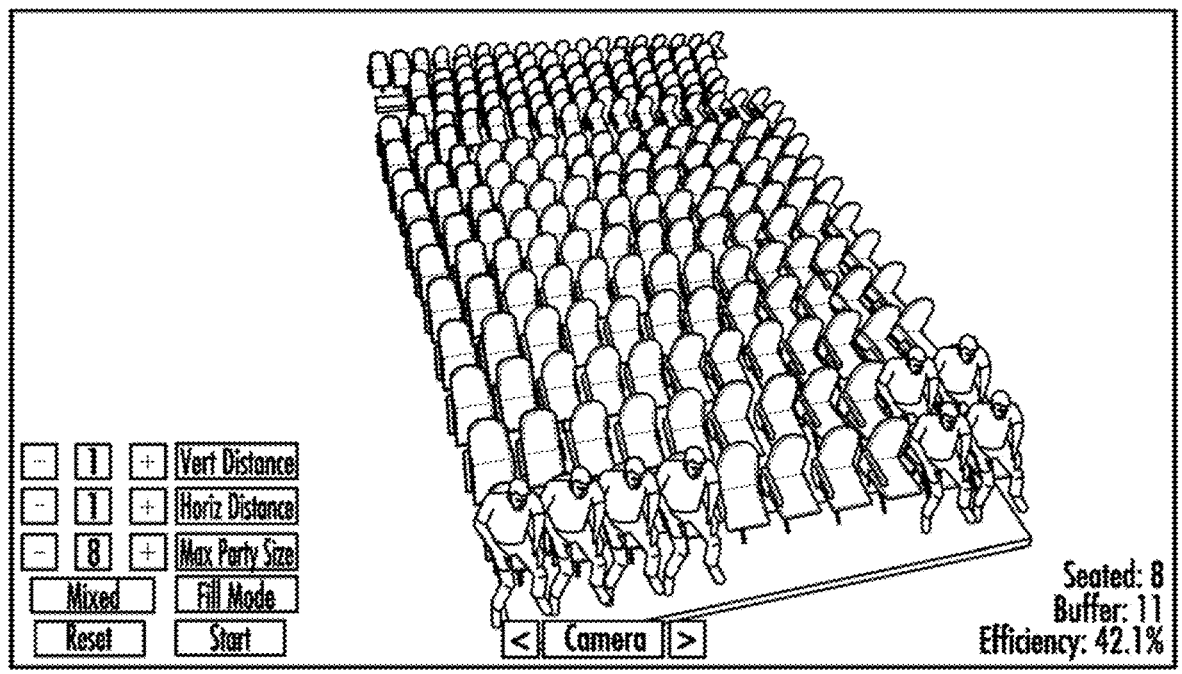
Figure 11A:
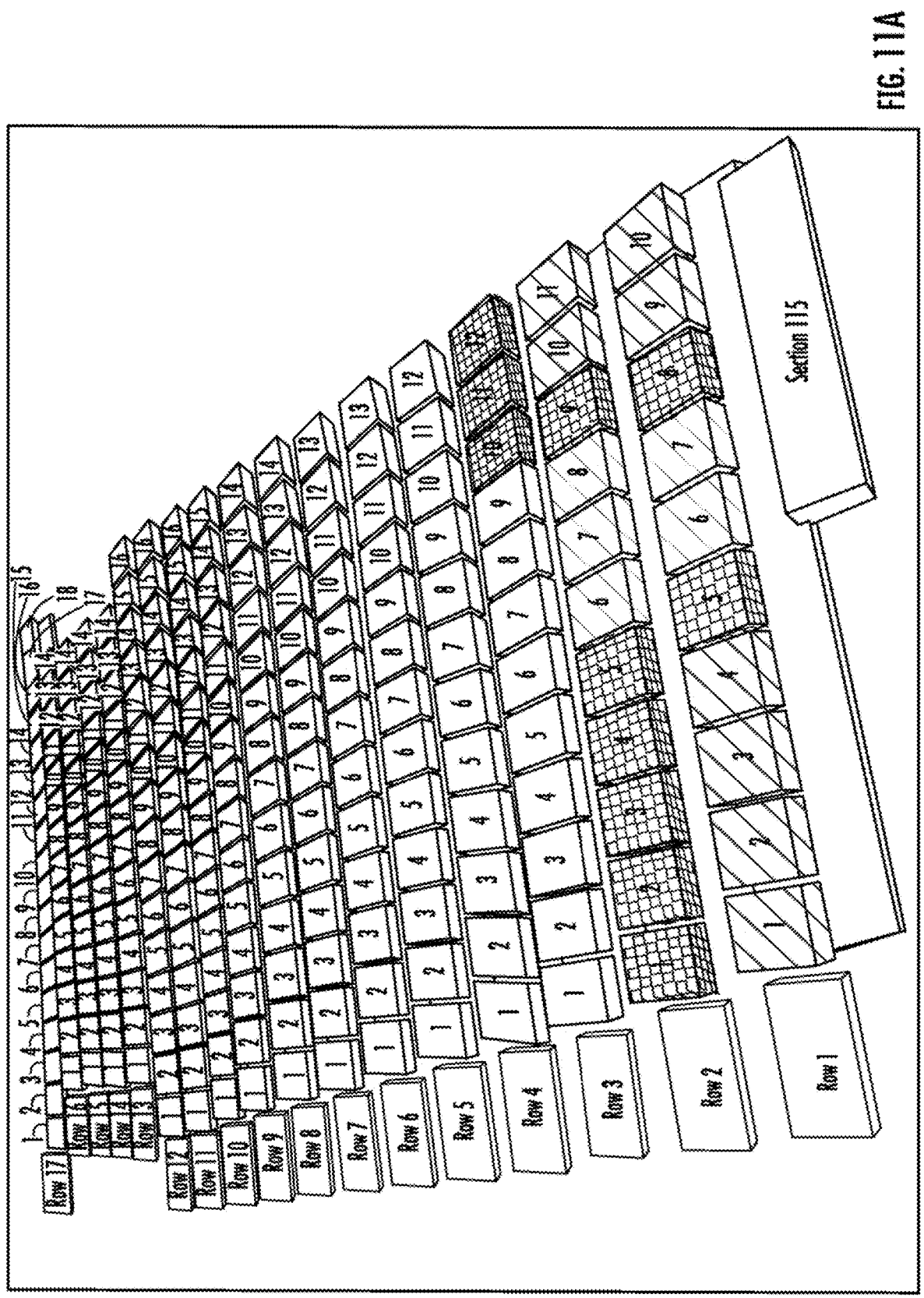
Figure 11B:
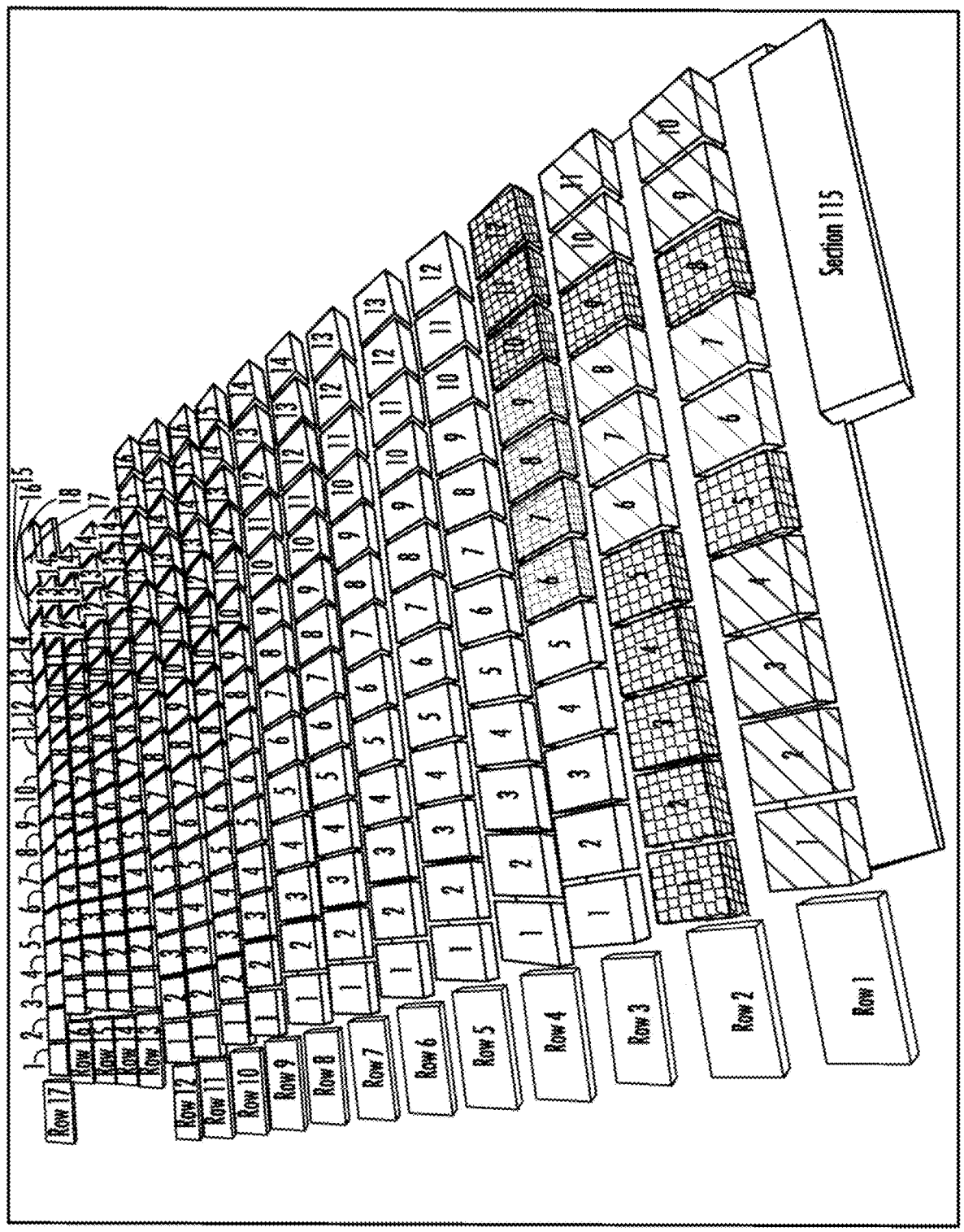
Figure 11C:
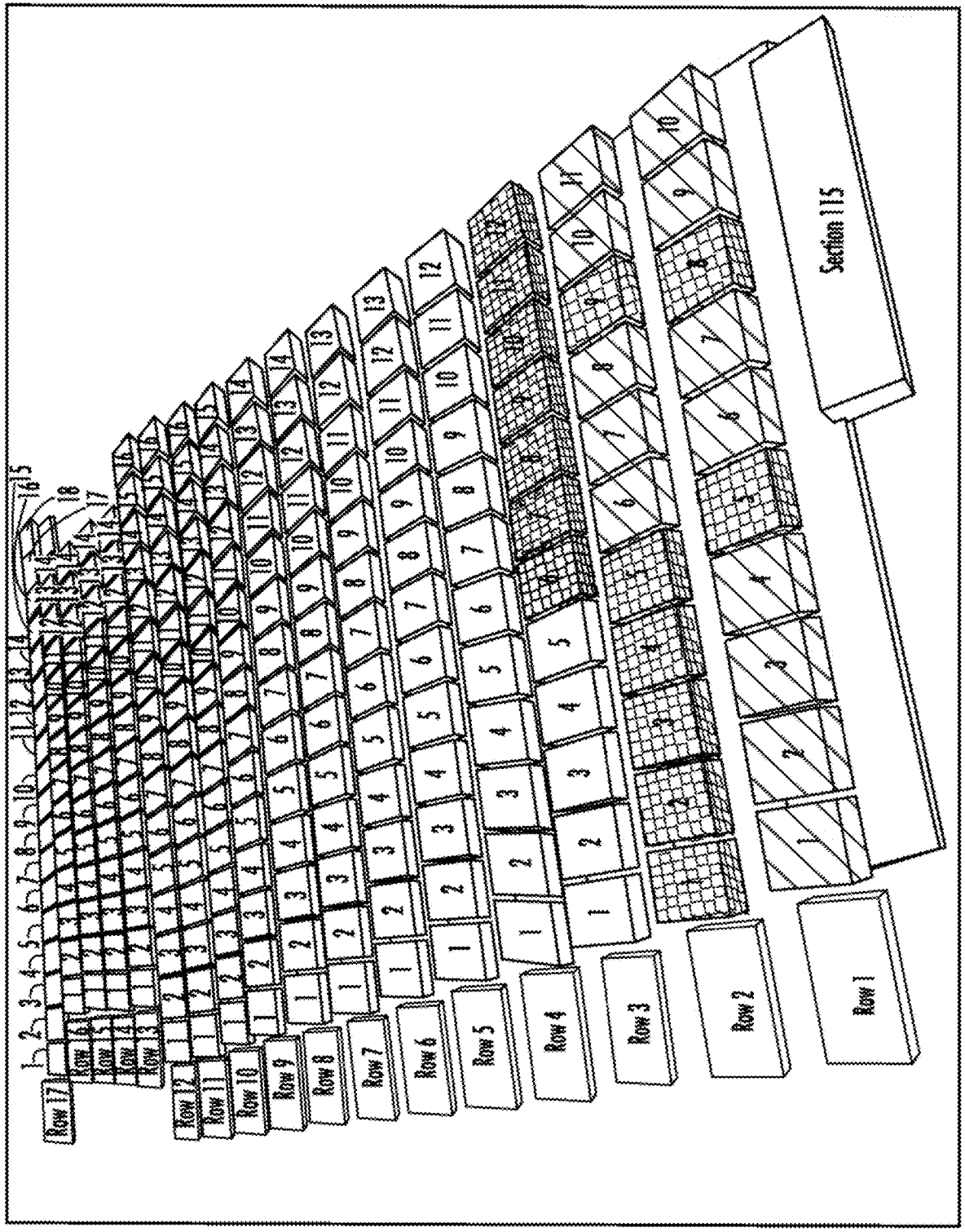
Figure 12A:
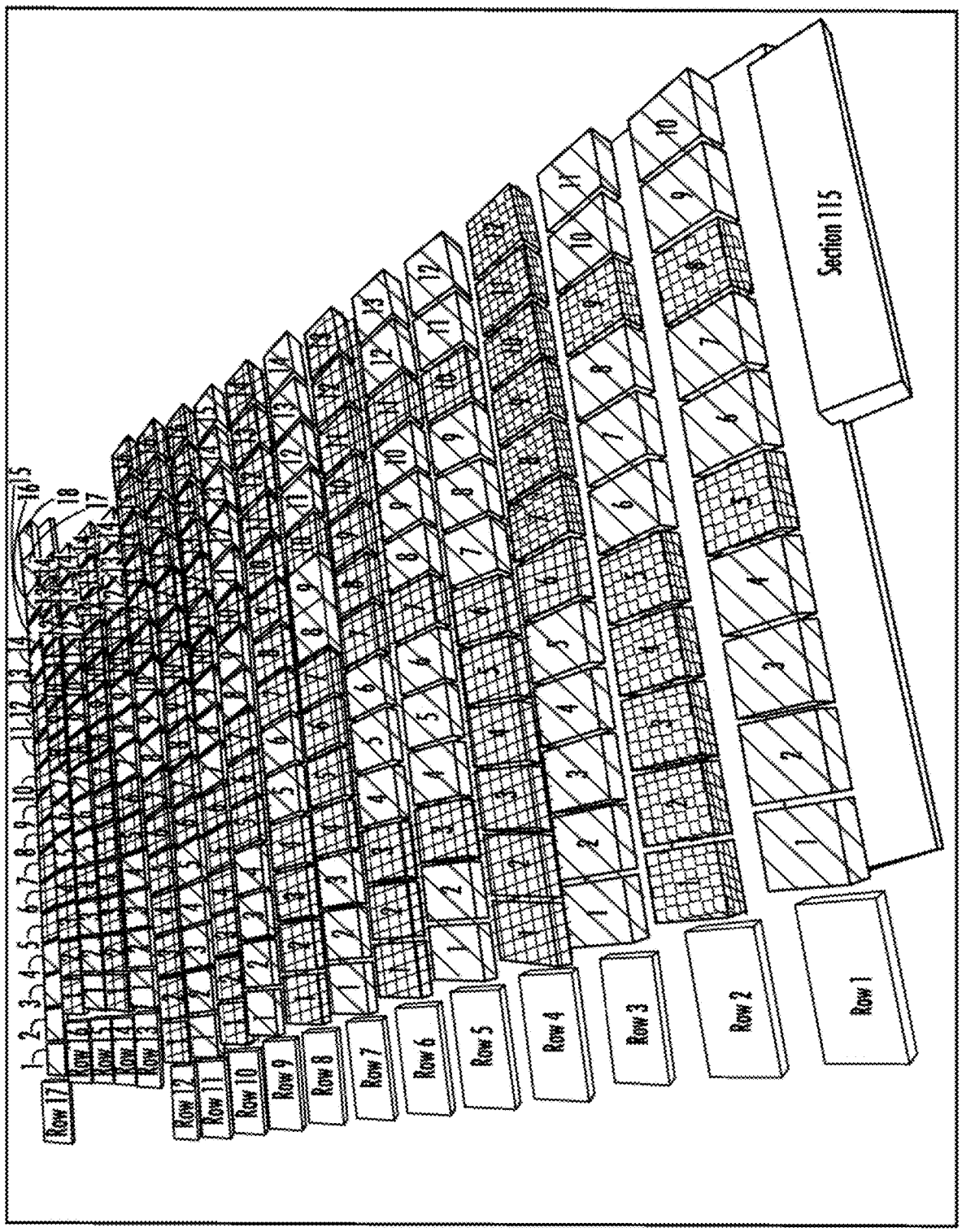
Figure 12B:
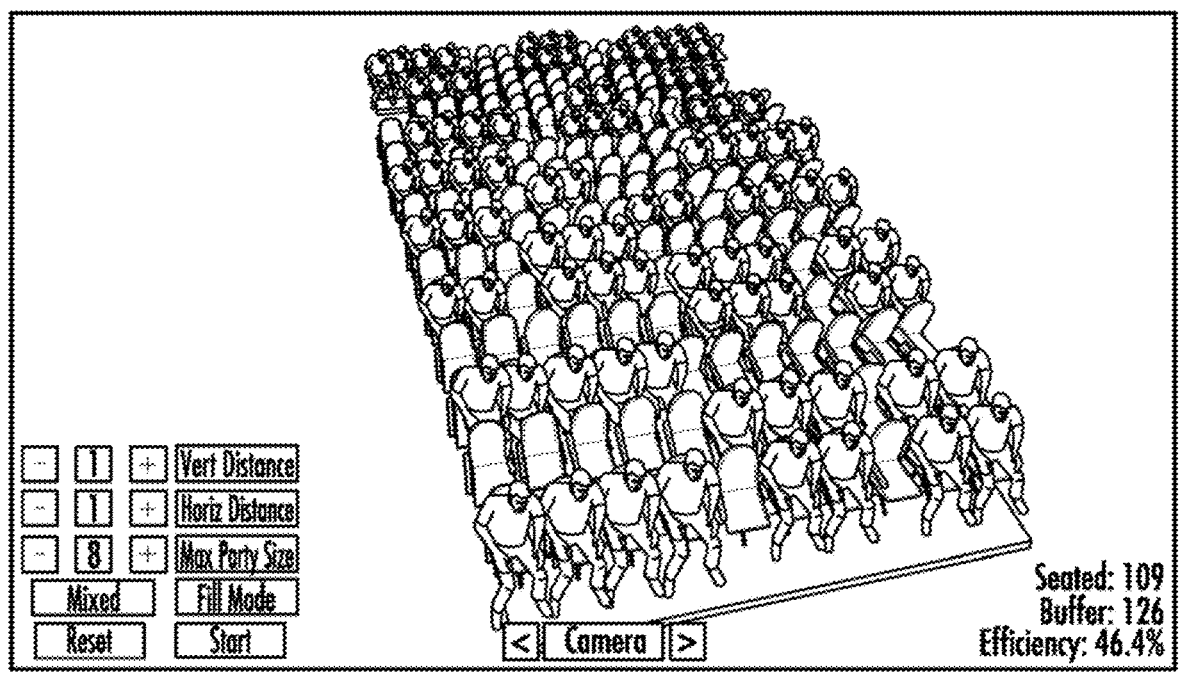
Figure 13A:
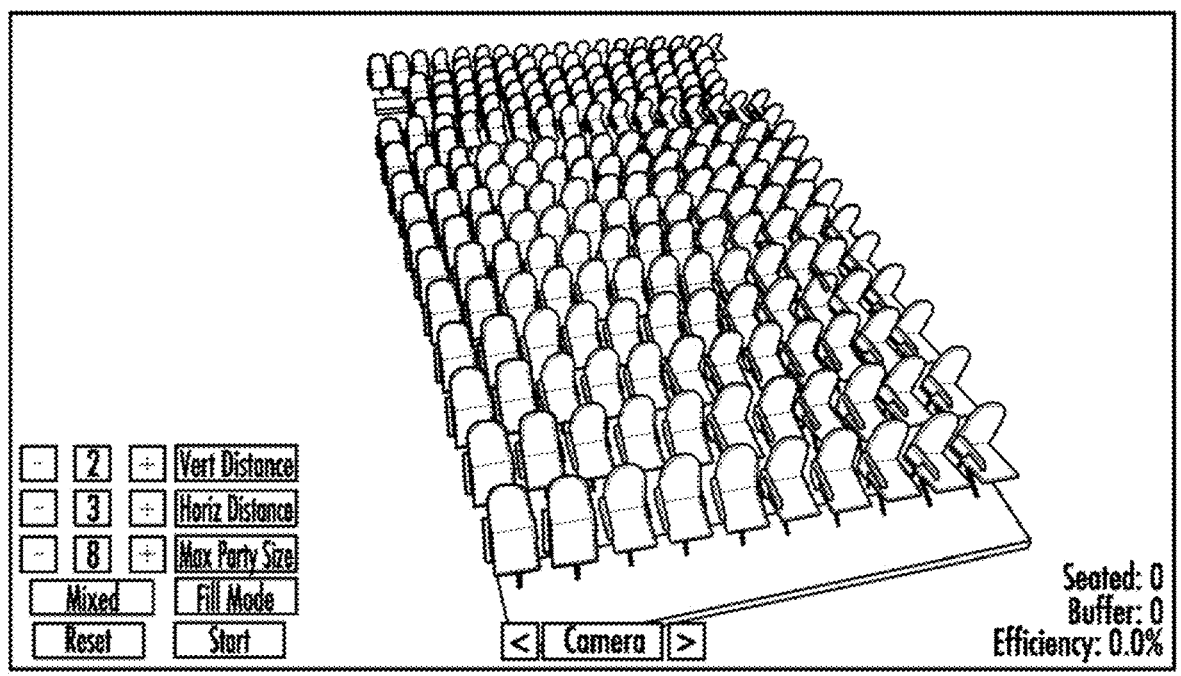
Figure 13B:
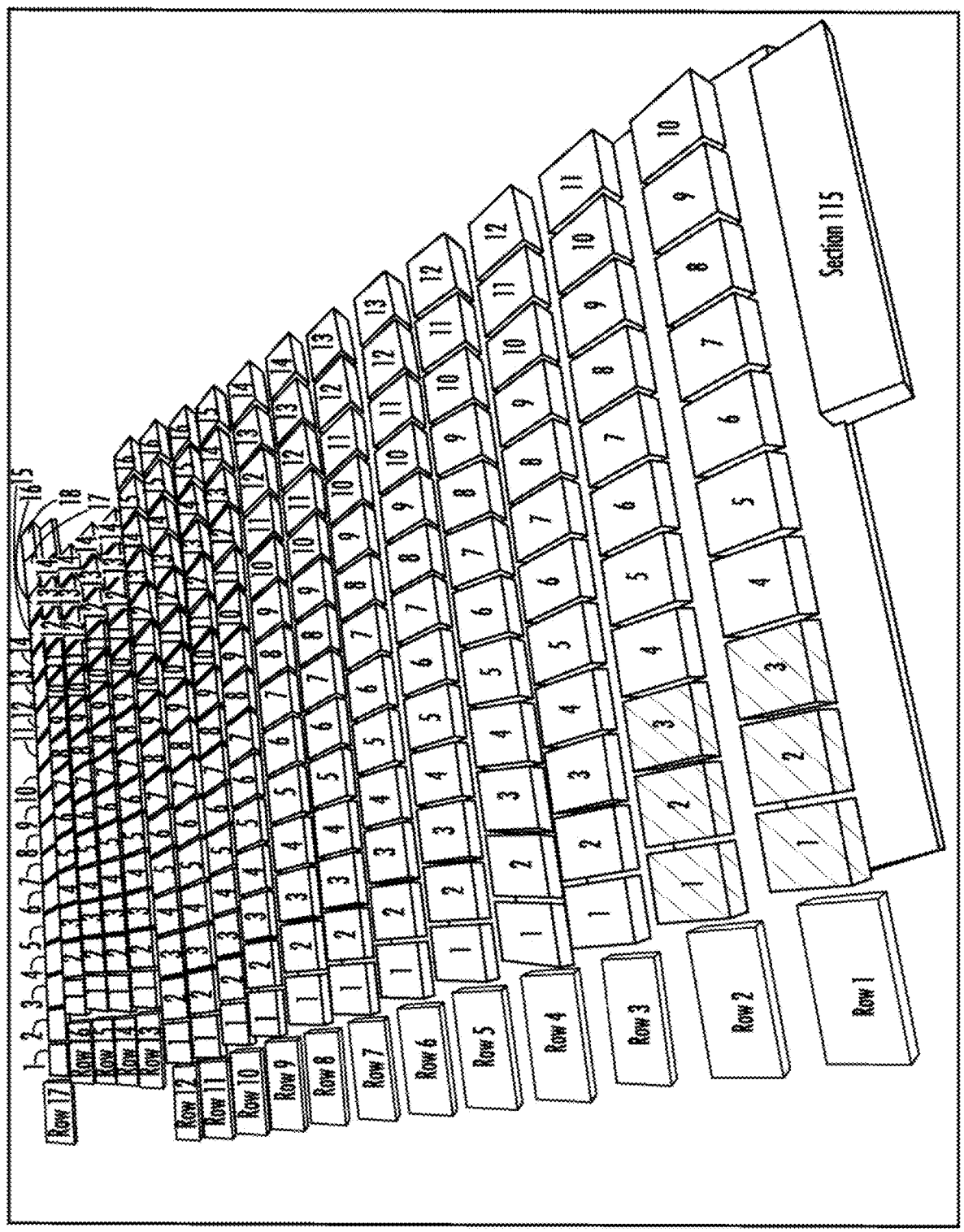
Figure 13C:
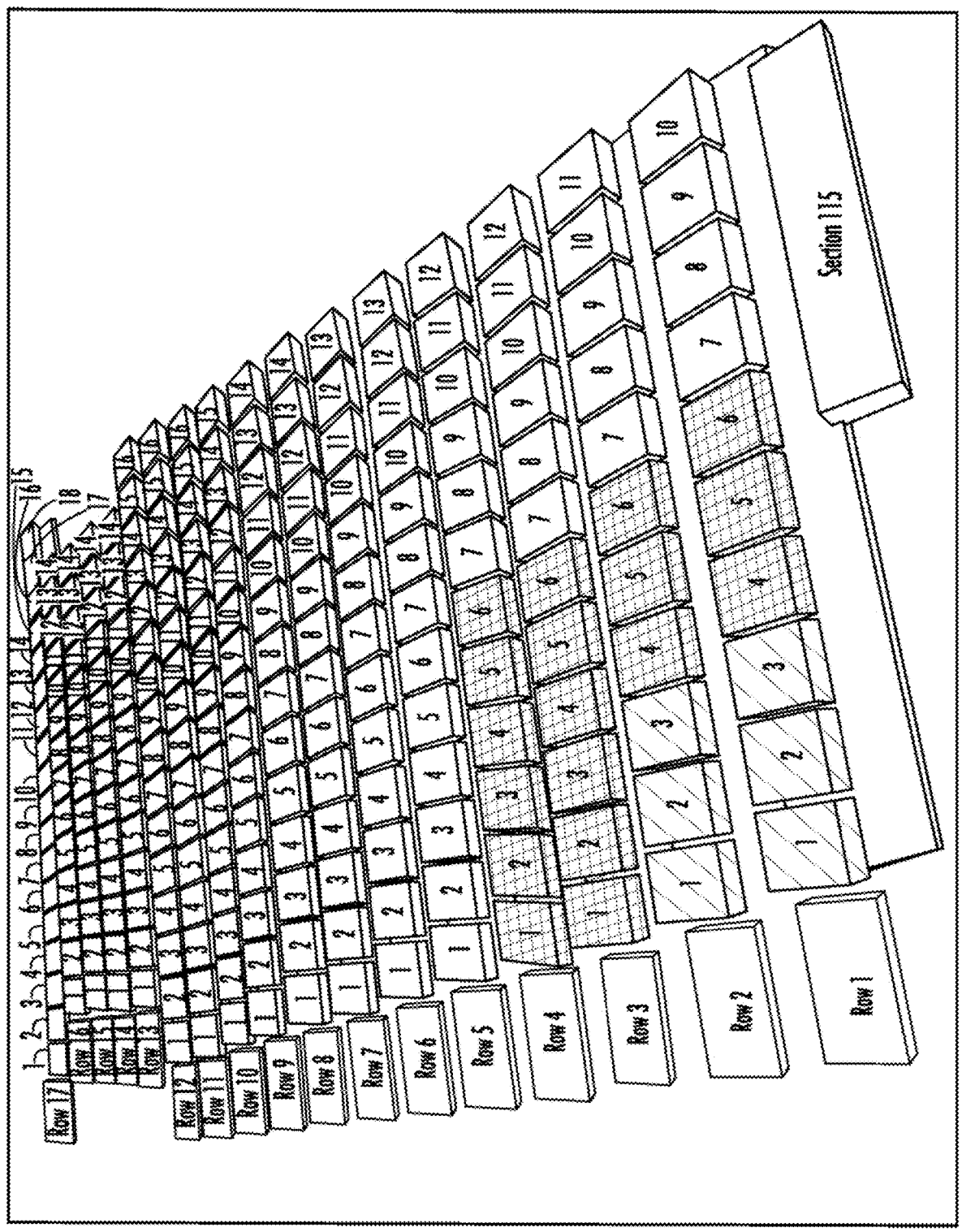
Figure 13D:
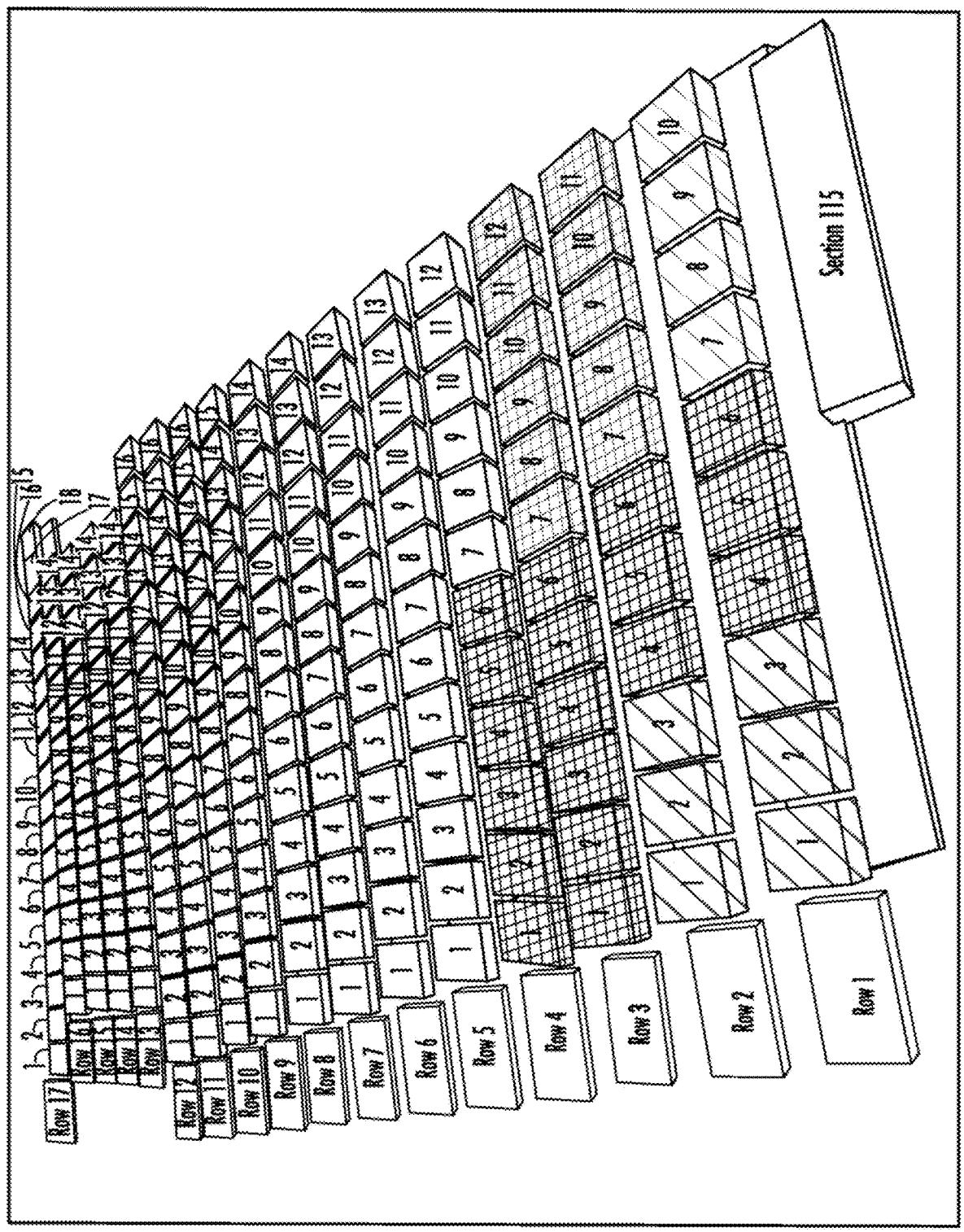
Figure 13E:
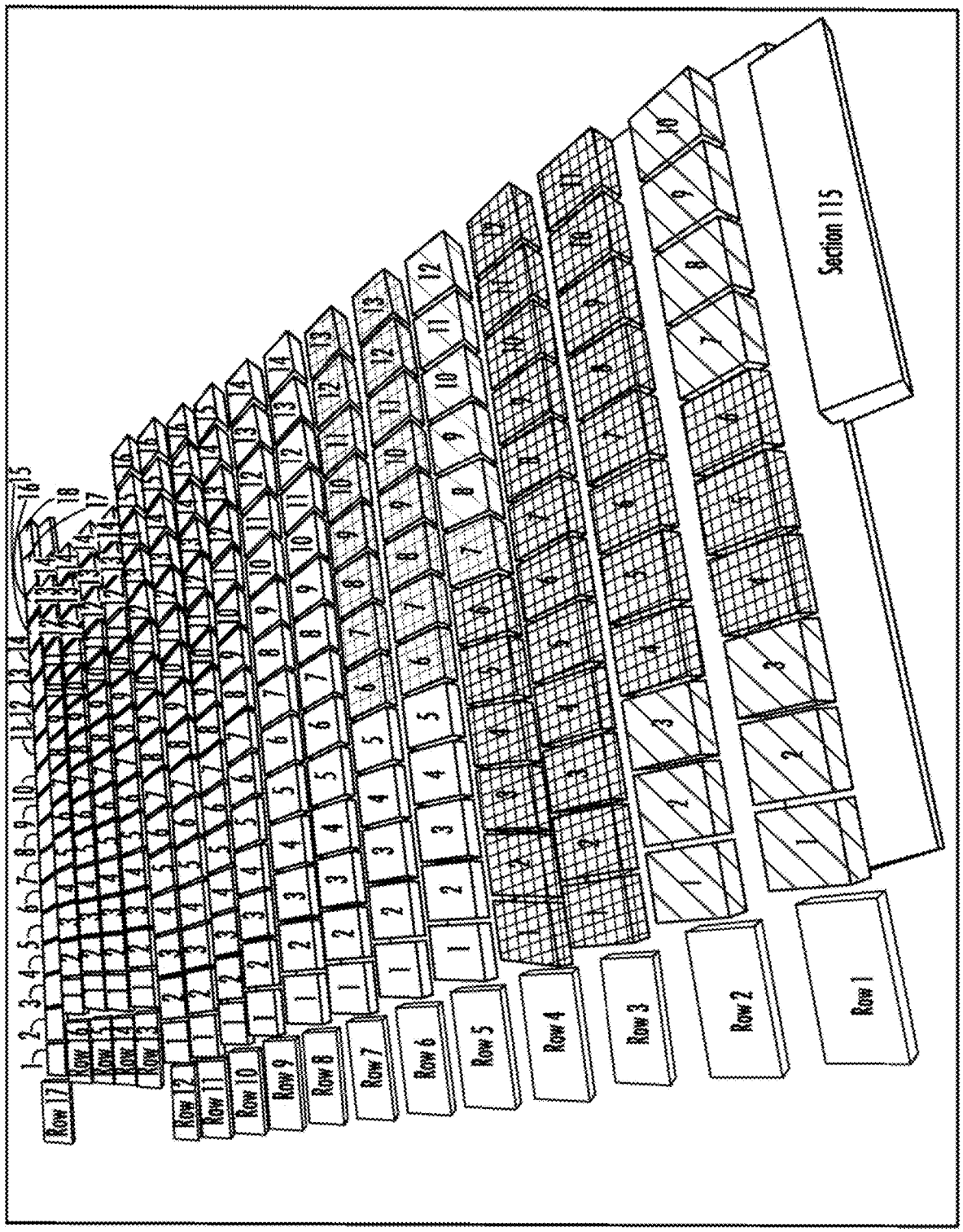
Figure 13F:
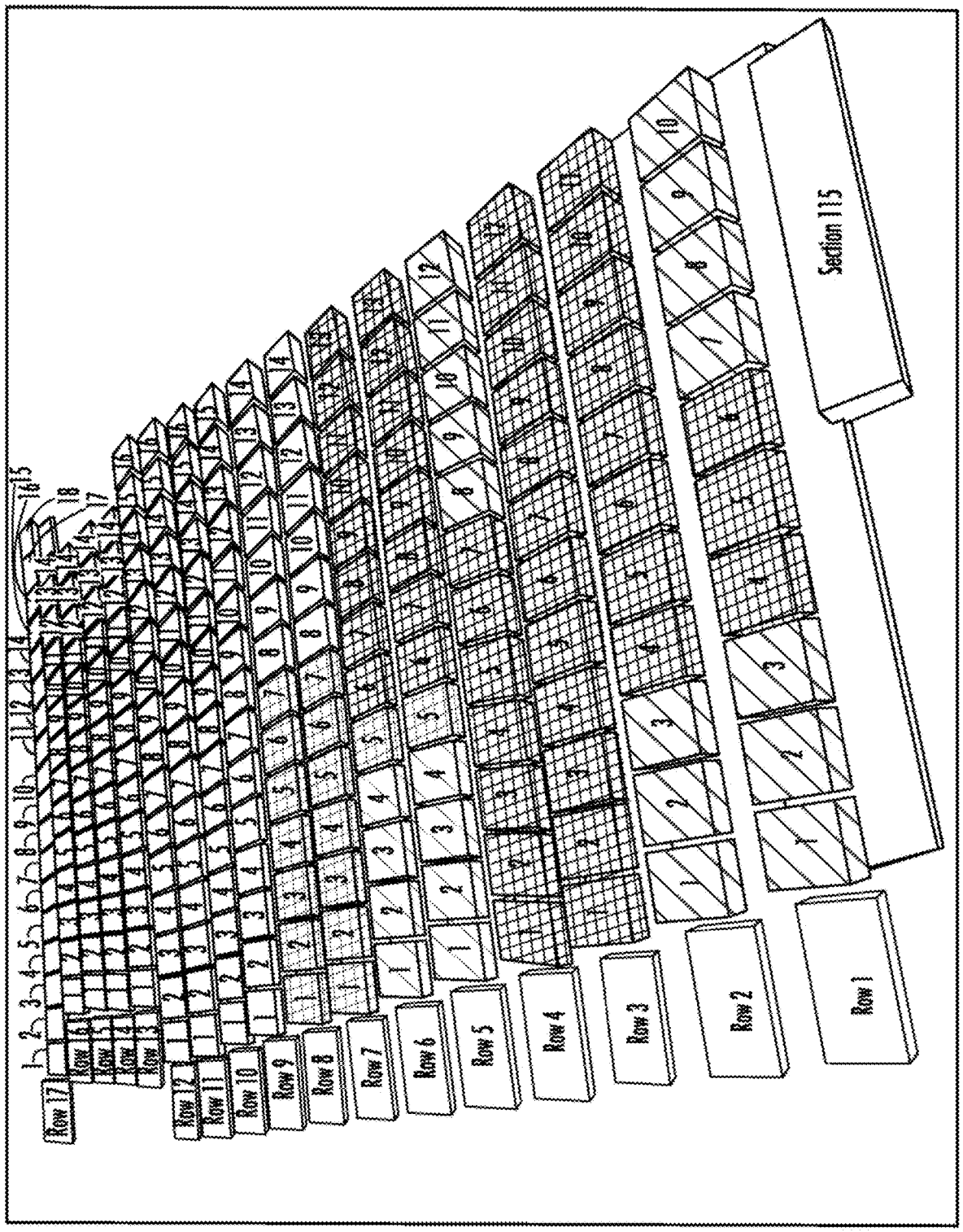
Figure 13G:
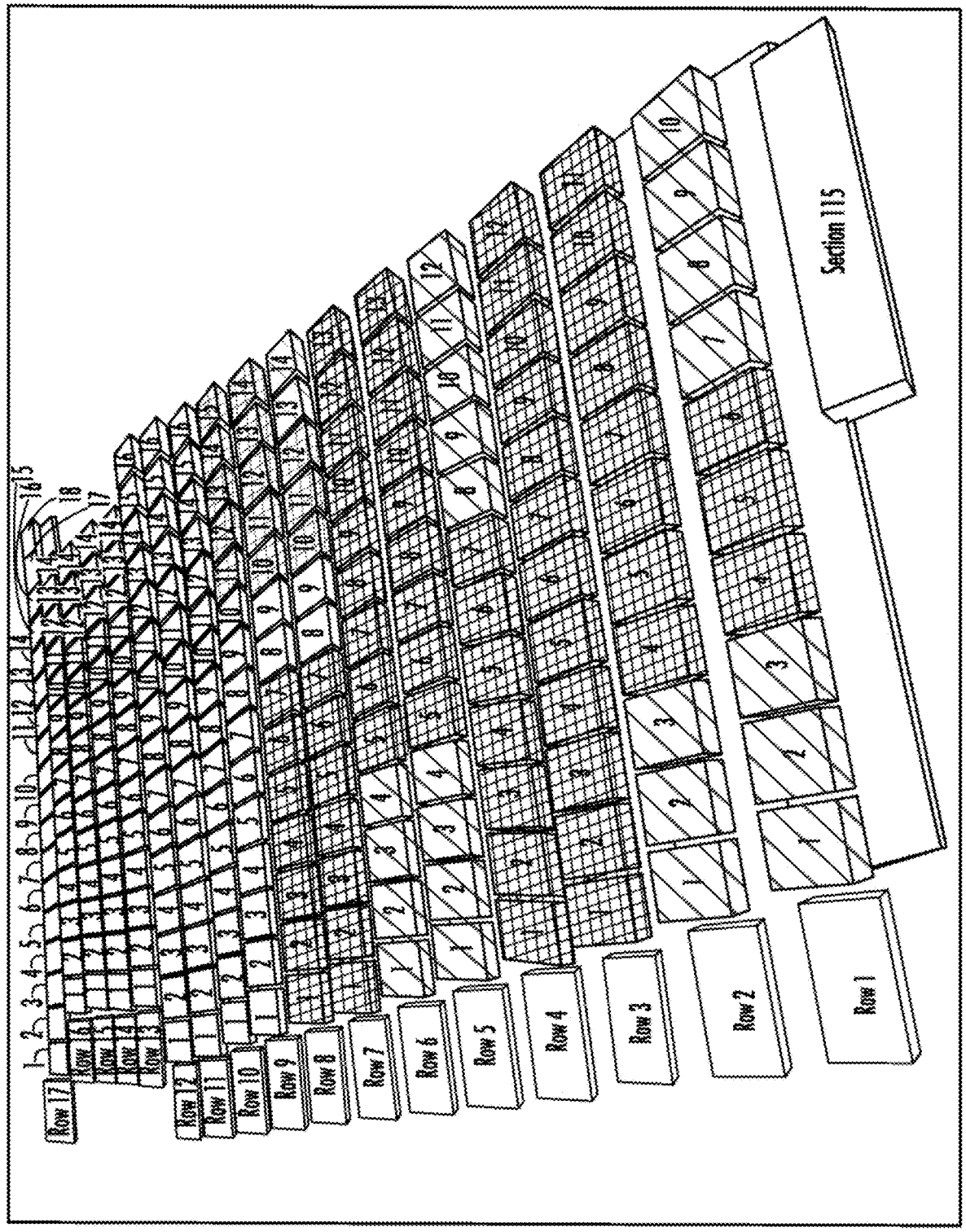
Figure 13H:
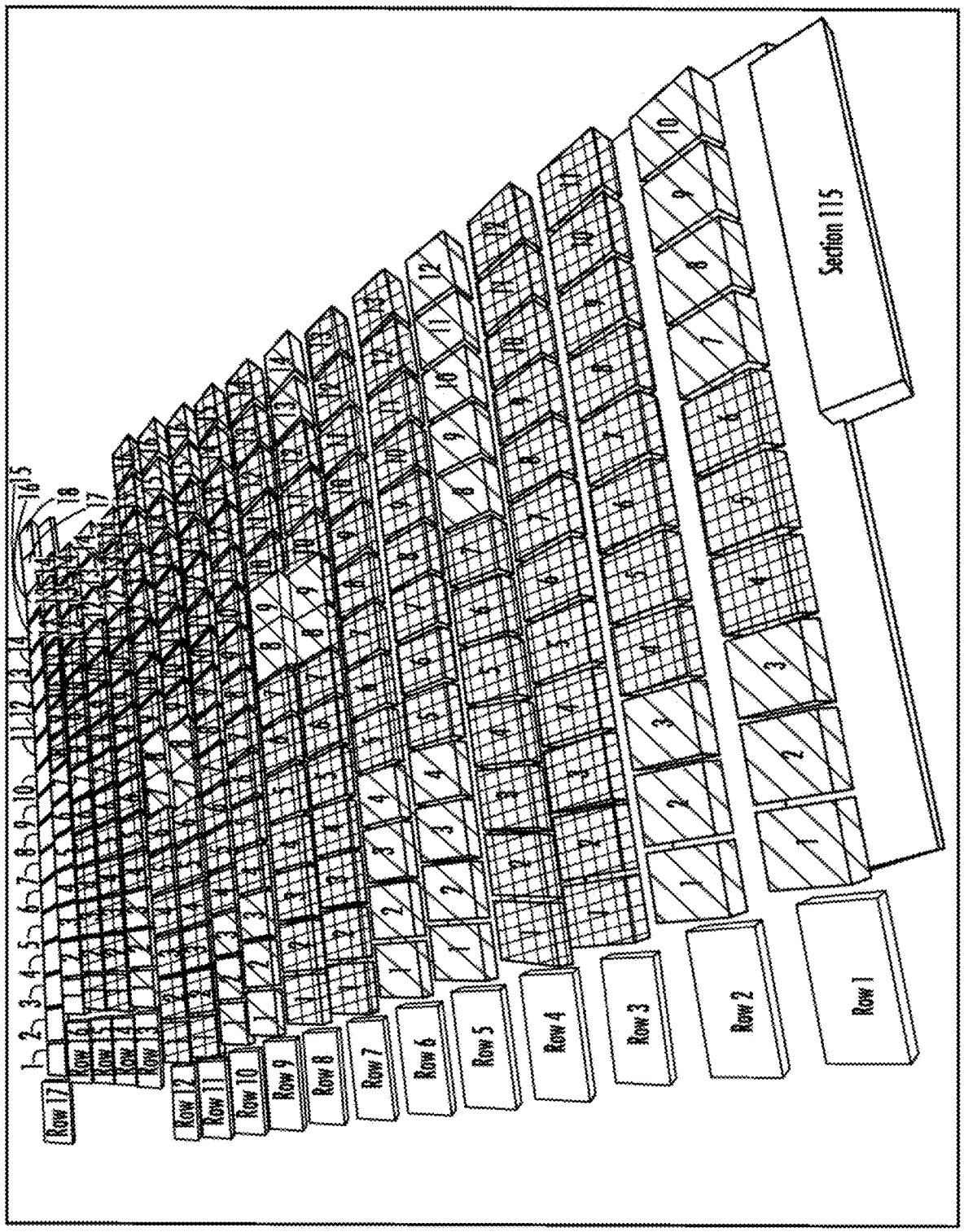
Figure 14A:
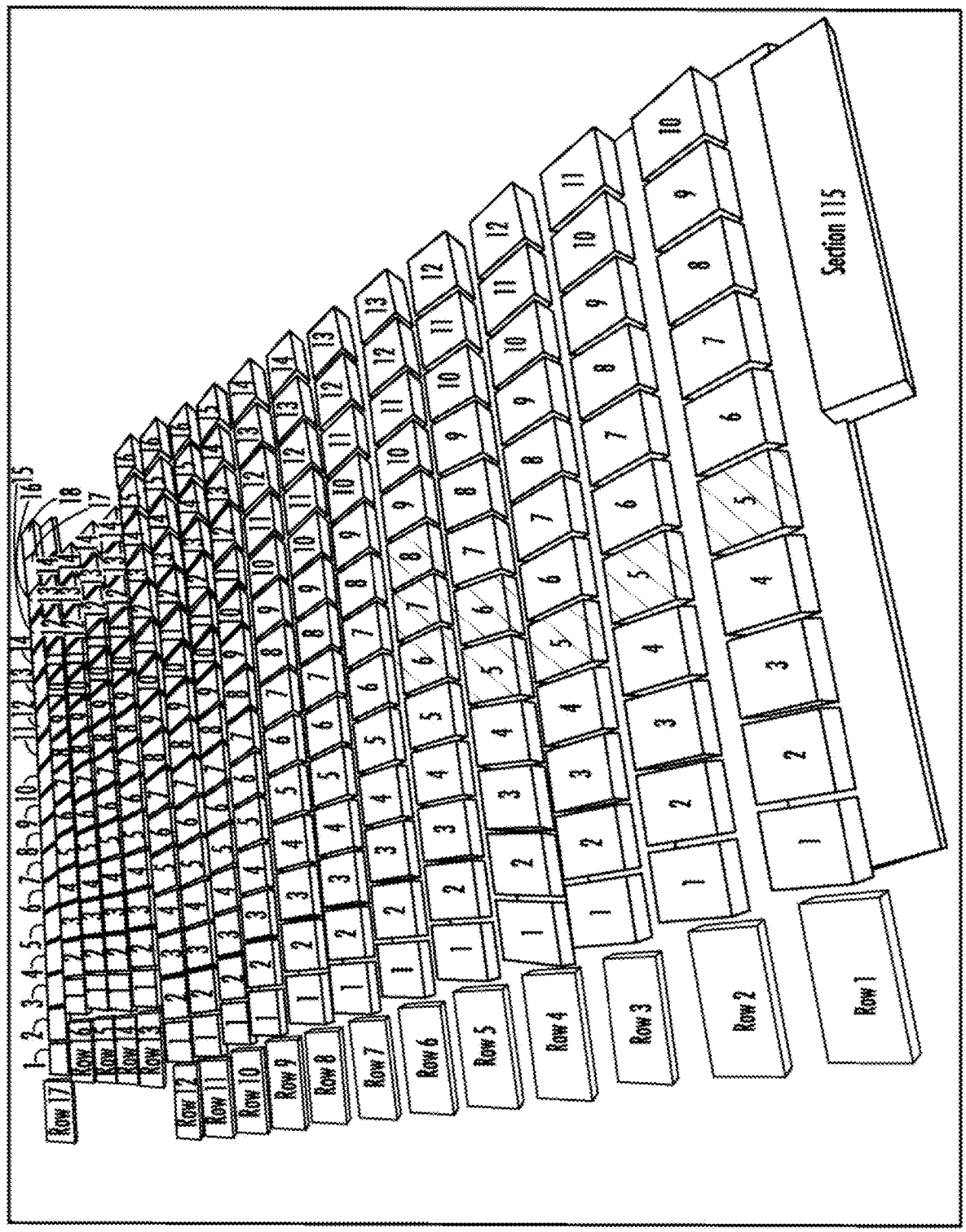
Figure 14B:
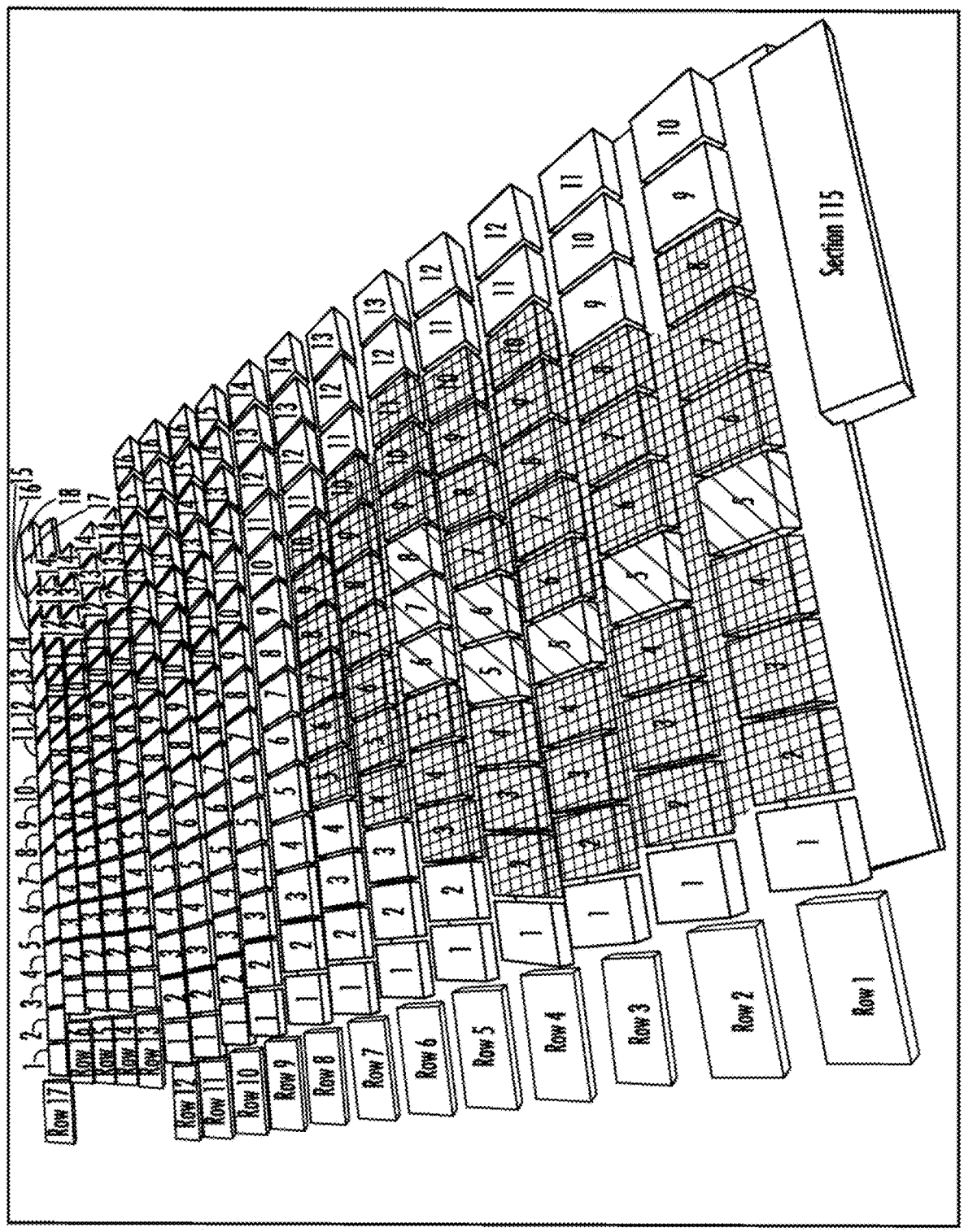
Figure 14C:
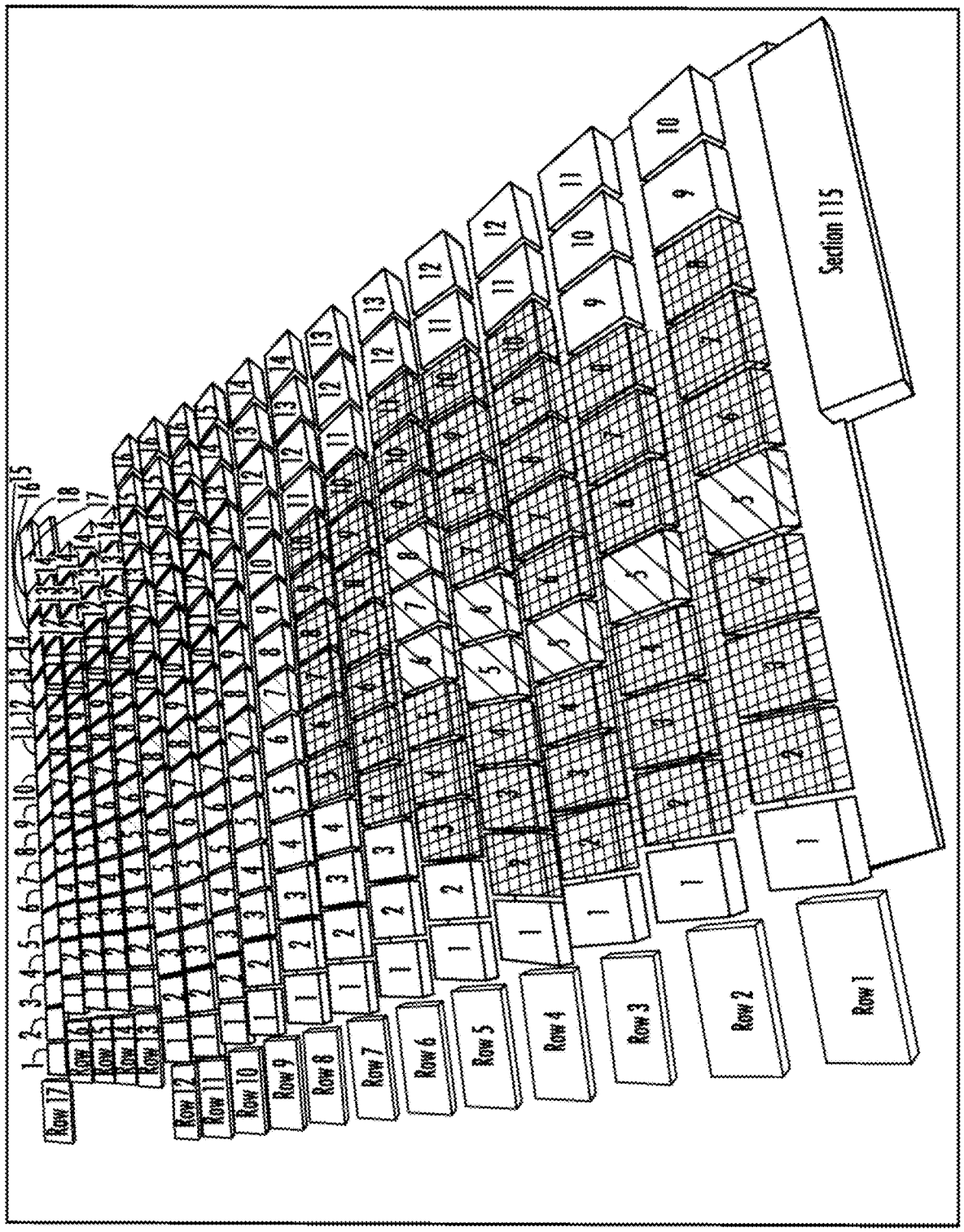
Figure 14D:
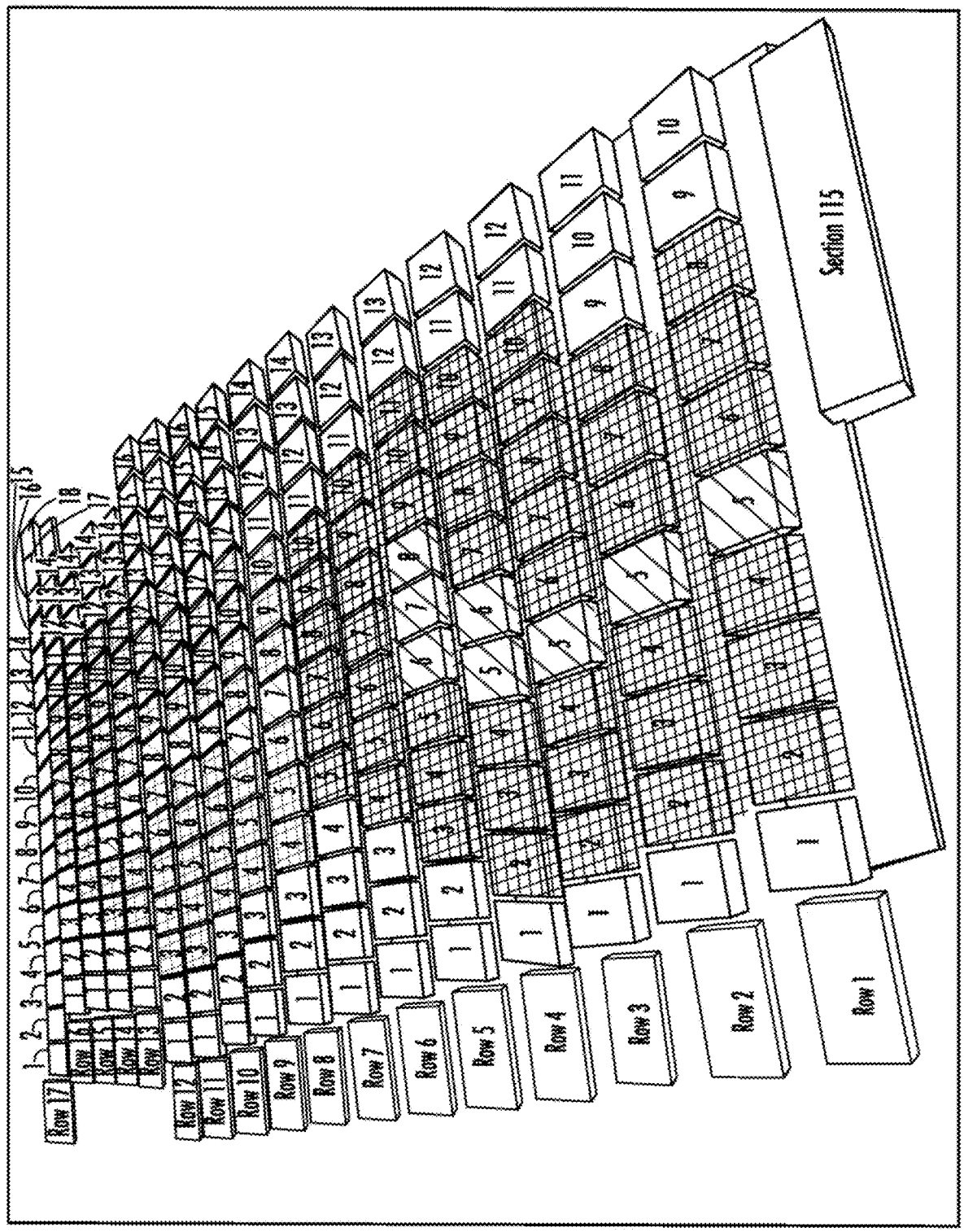
Figure 14E:
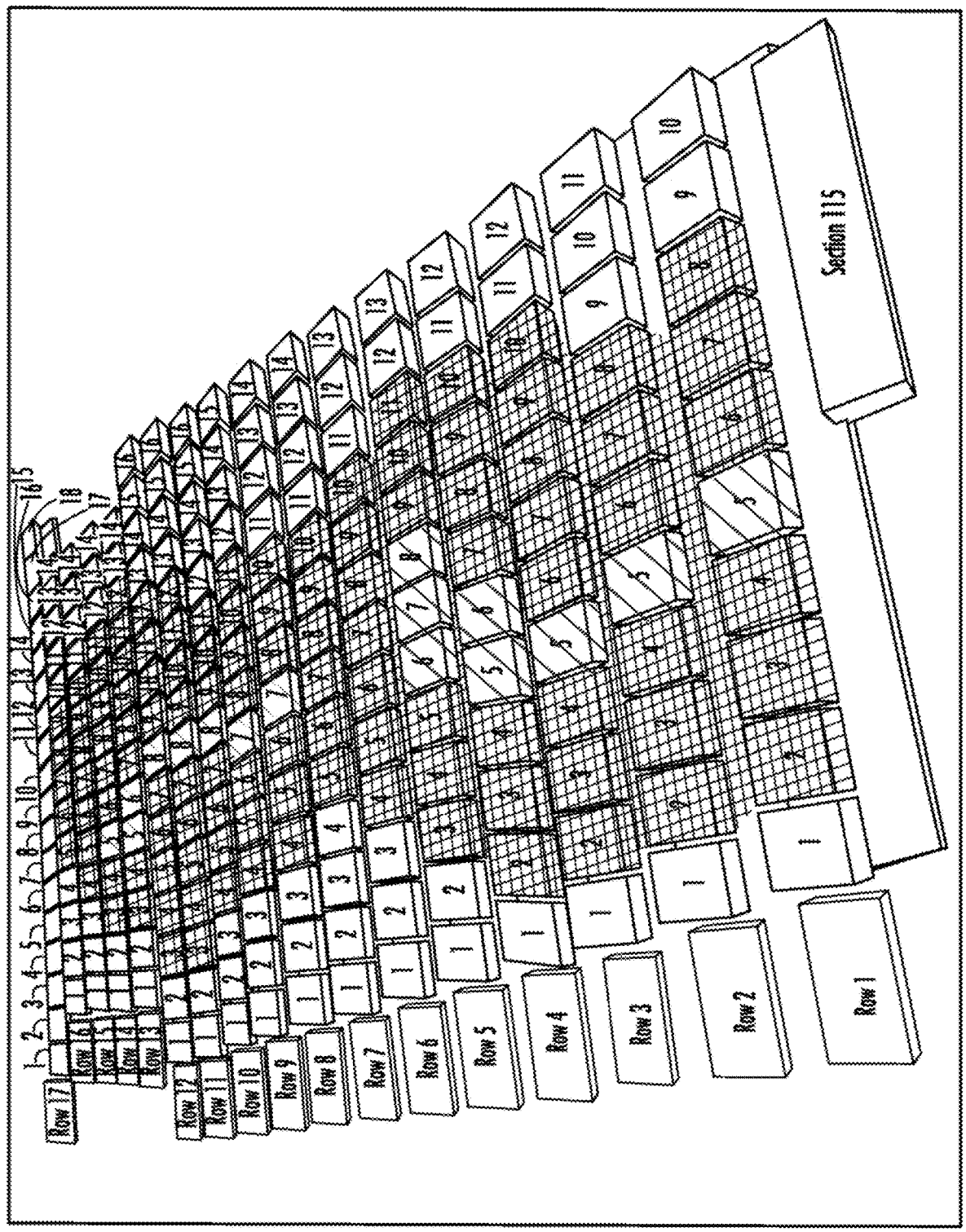
Figure 15A:
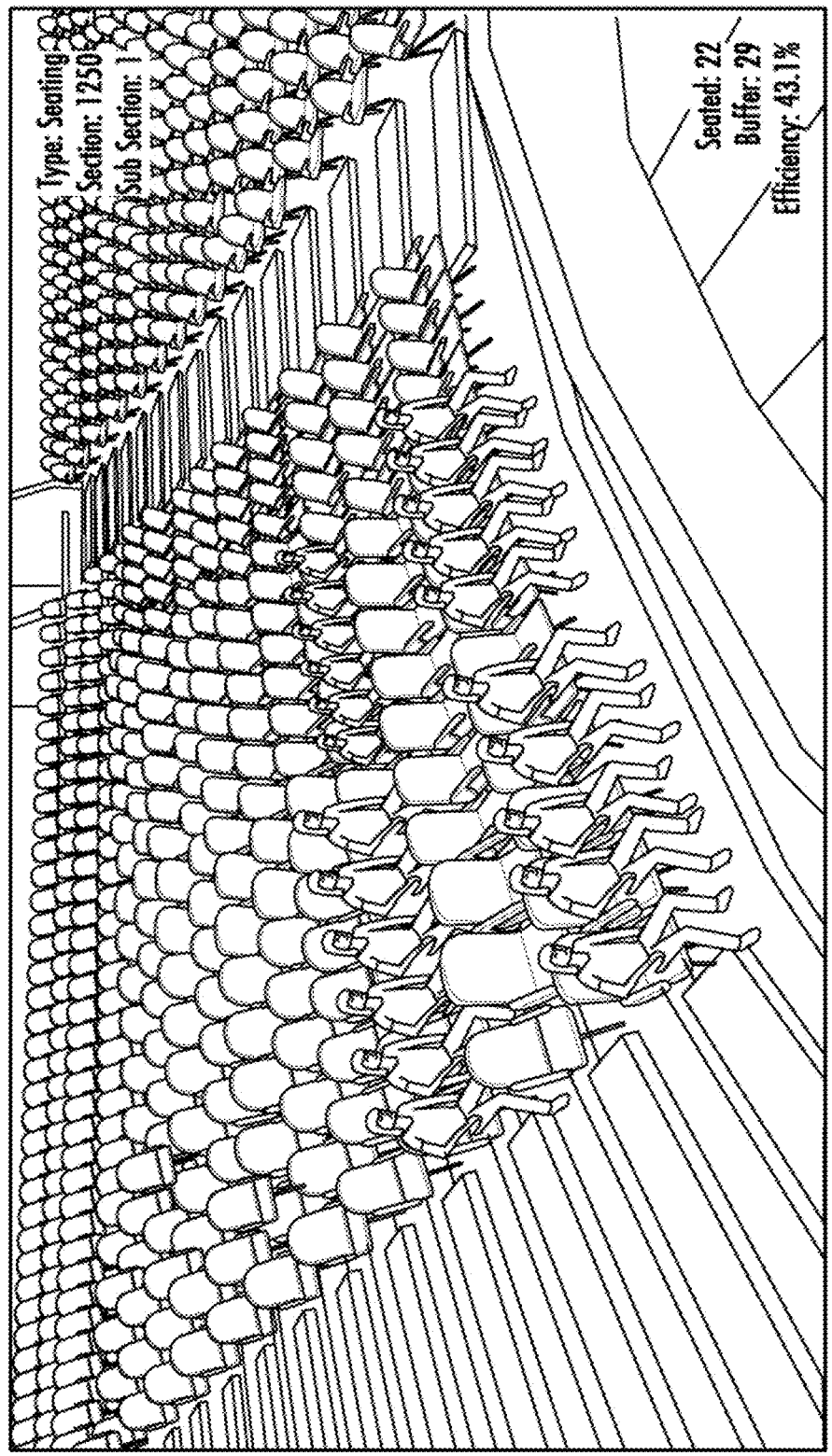
Figure 15B:
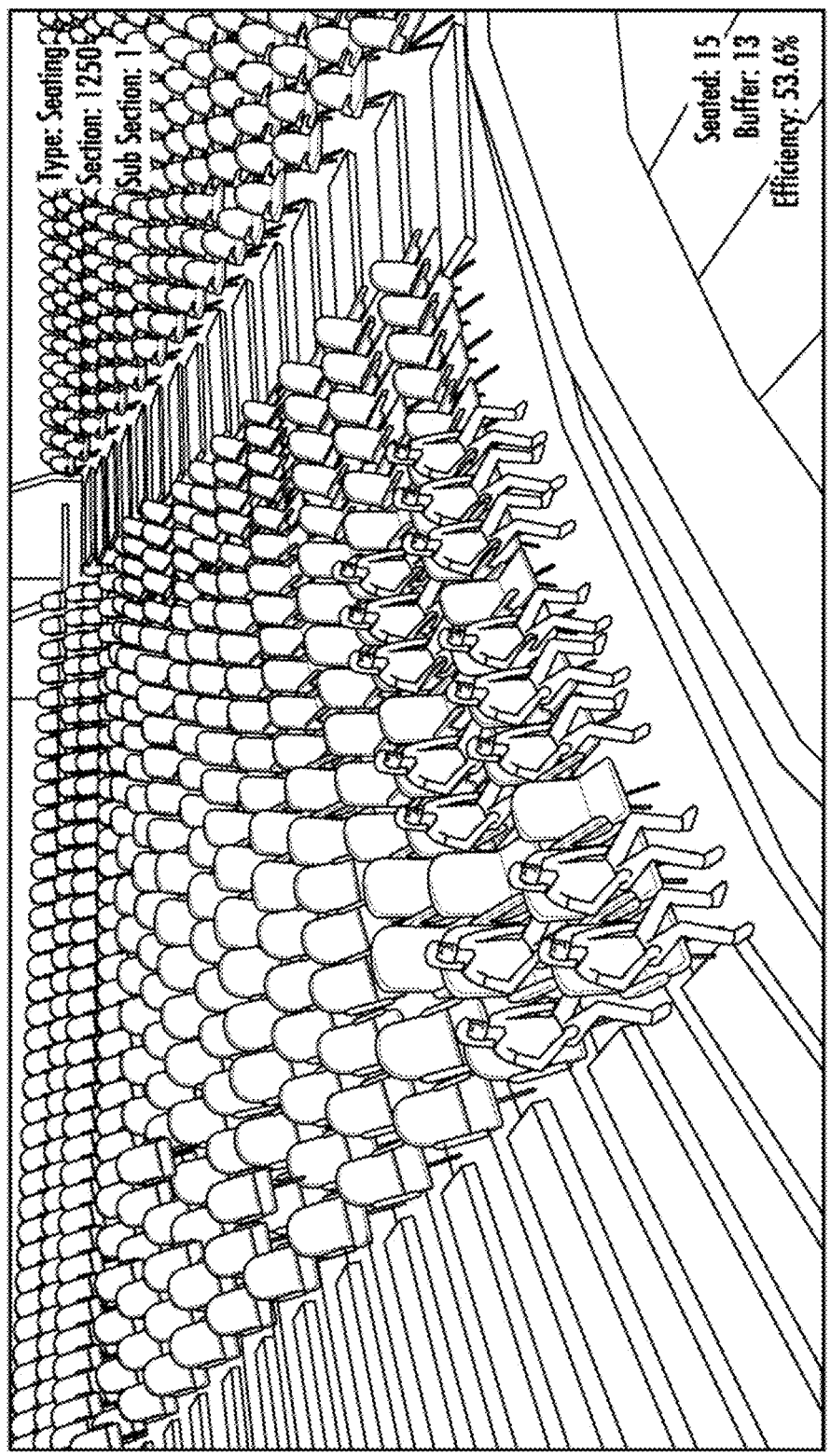
Figure 15C:
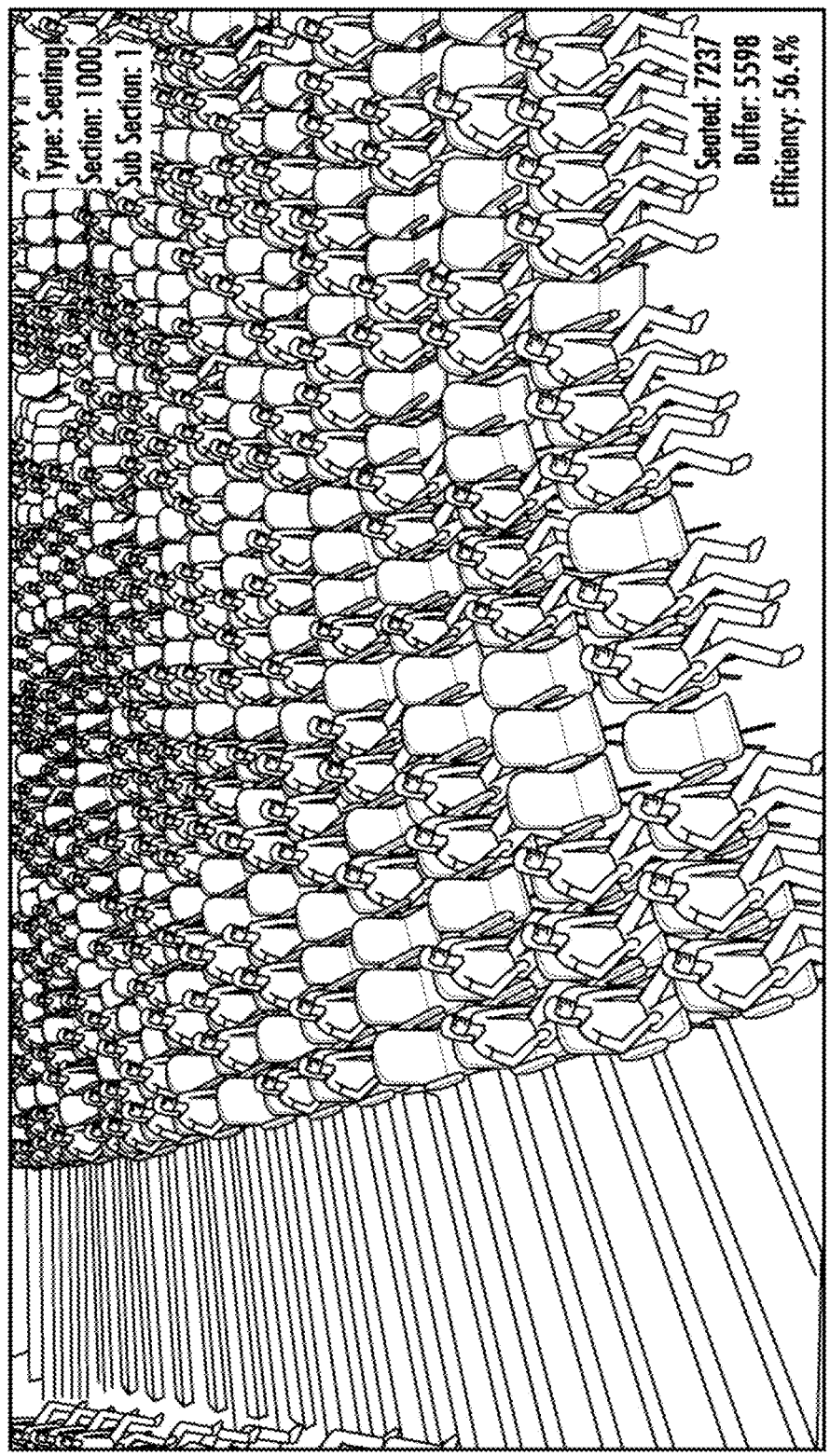
Figure 16A:
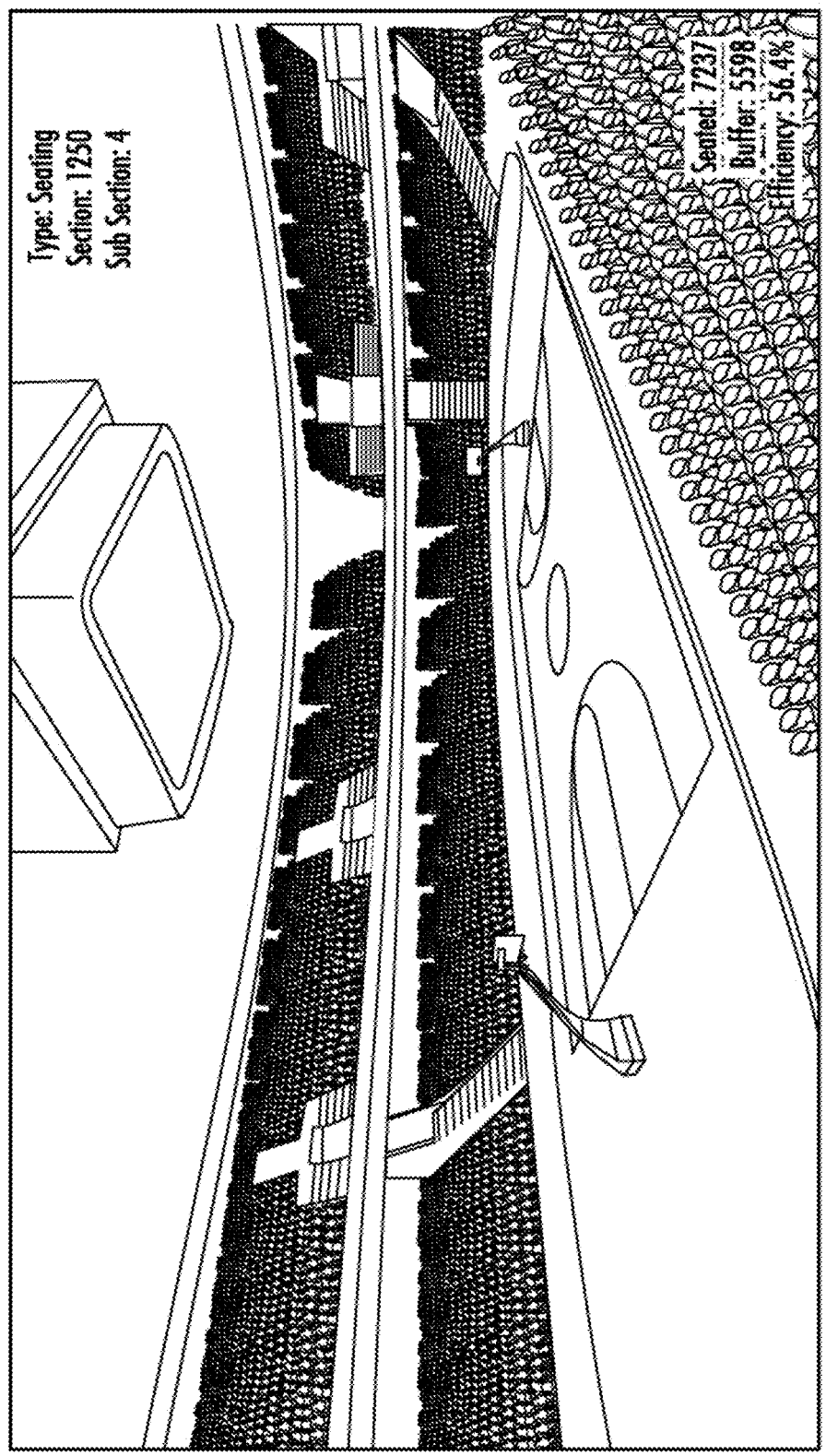
Figure 16B:
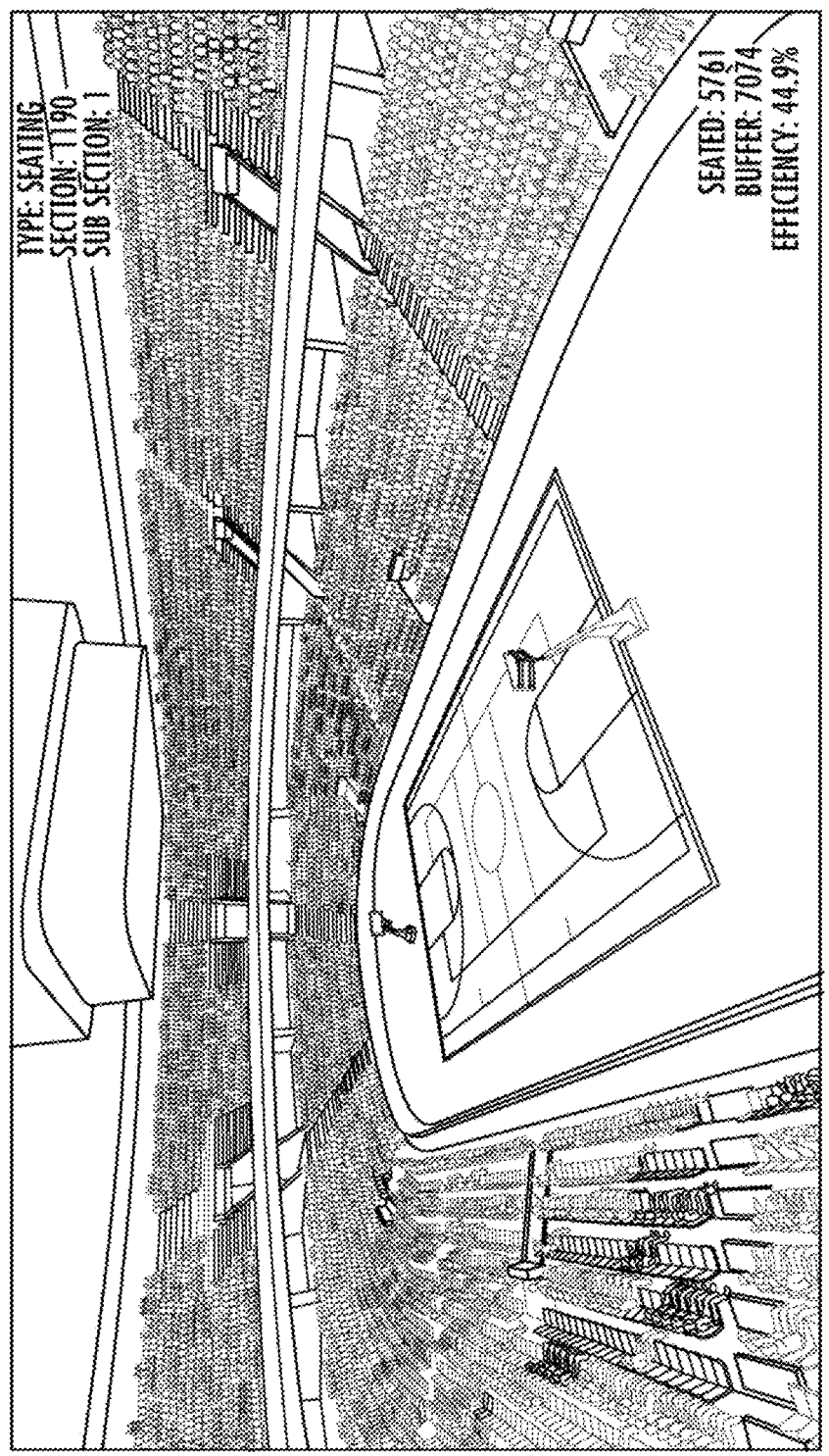
Figure 17A:
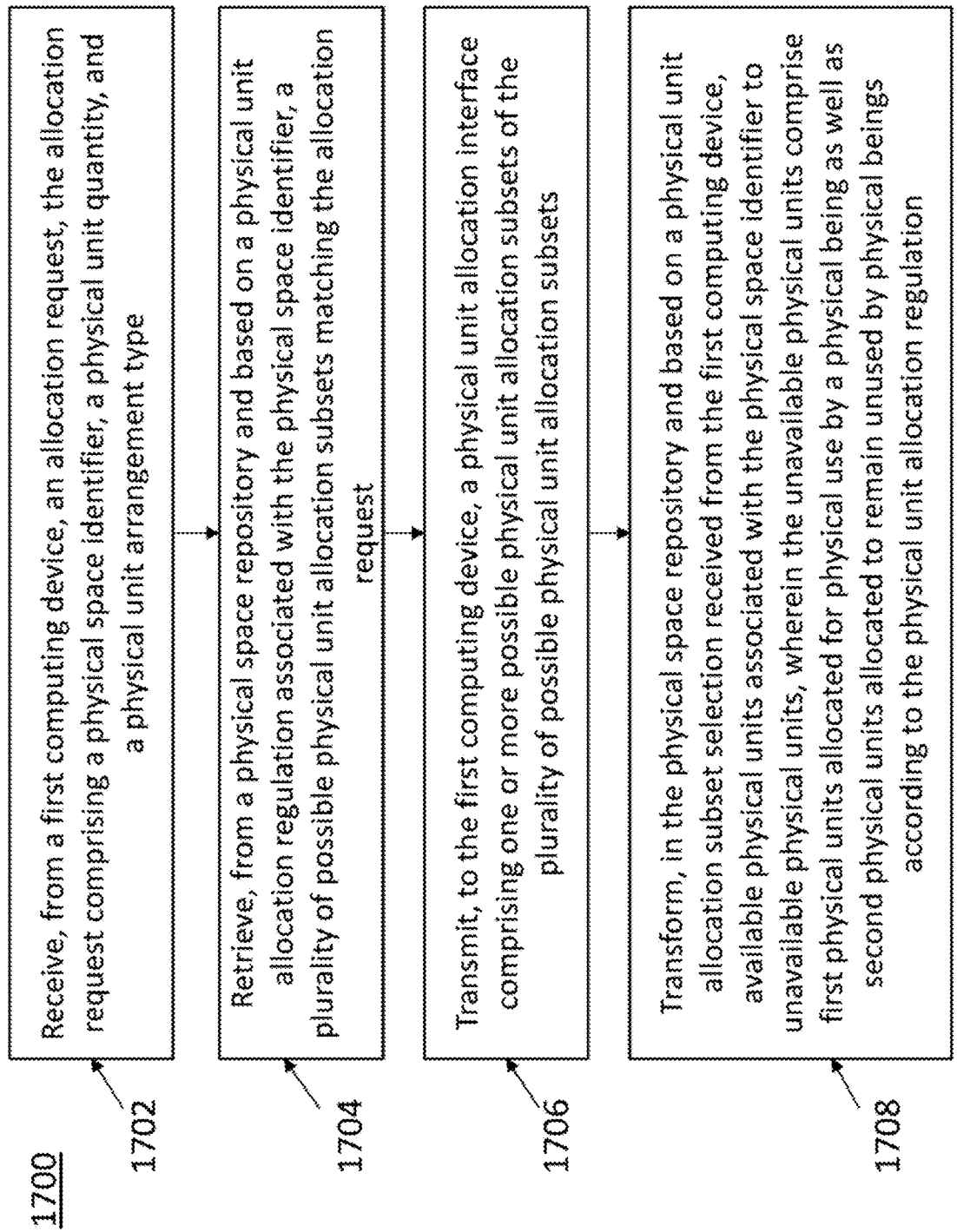
Figure 17B:
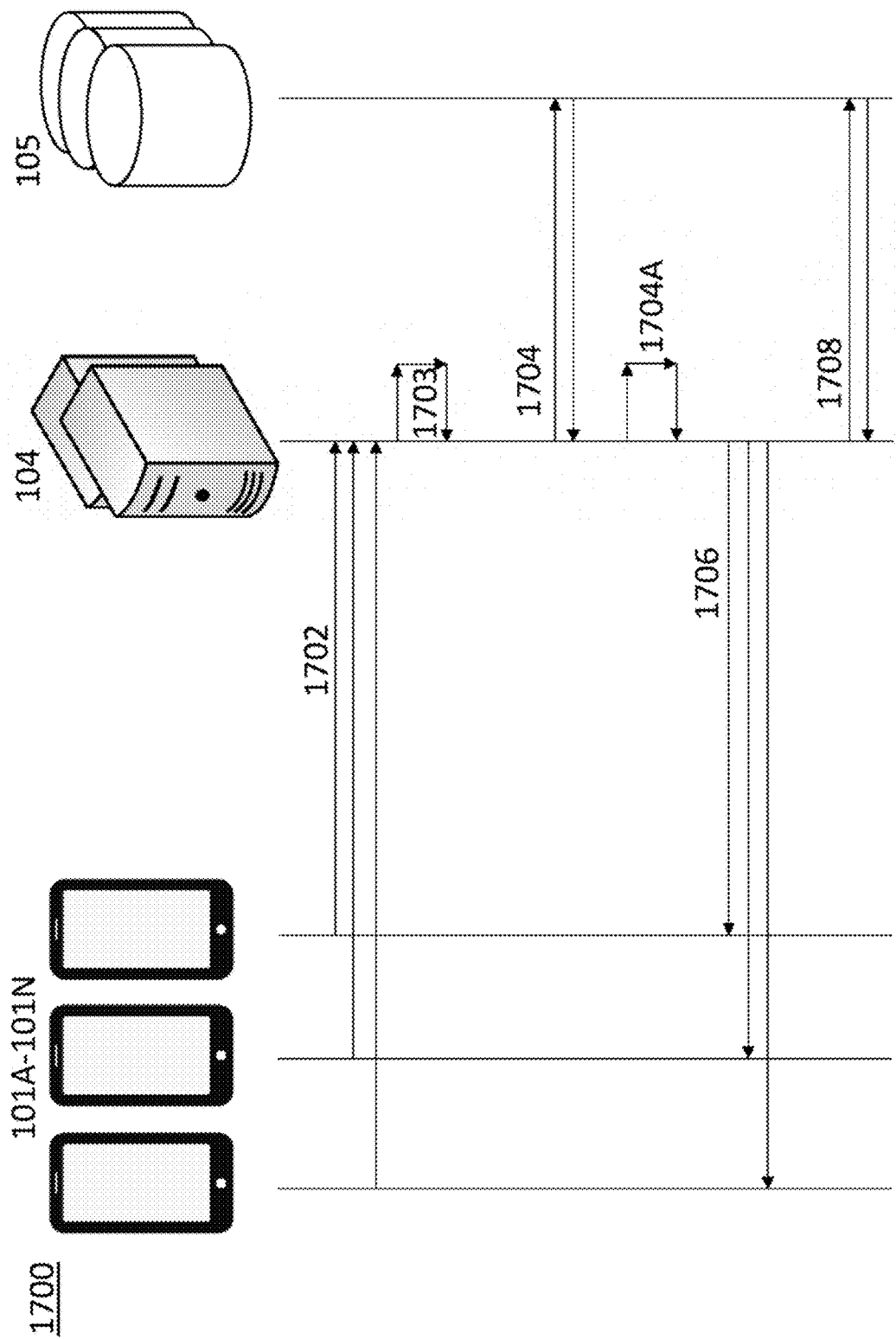

Having thus described the disclosure in general terms, reference will now be made to the accompanying drawings, which are not necessarily drawn to scale, and wherein:

FIG. 1 is a system architecture diagram of a physical unit allocation system configured to practice embodiments of the present disclosure;

FIG. 2 is an exemplary schematic diagram of a computing entity according to one embodiment of the present disclosure;

FIG. 3 is an exemplary seat selection interface known in the art;

FIG. 4 is an exemplary physical space comprising a plurality of physical units for allocation, for use with embodiments of the present disclosure;

FIG. 5 is an exemplary multi-dimensional matrix representing an exemplary physical space of FIG. 4 comprising a plurality of physical units for allocation, for use with embodiments of the present disclosure;

FIG. 6A is an exemplary multi-dimensional matrix representing a physical space comprising a plurality of physical units for allocation, for use with embodiments of the present disclosure;

FIG. 6B is an exemplary multi-dimensional matrix representing a physical space comprising a plurality of physical units for allocation, for use with embodiments of the present disclosure;

FIG. 7A is an exemplary multi-dimensional matrix representing a physical space comprising a plurality of physical units for allocation, for use with embodiments of the present disclosure;

FIG. 7B is an exemplary multi-dimensional matrix representing a physical space comprising a plurality of physical units for allocation, for use with embodiments of the present disclosure;

FIGS. 8A, 8B, 8C, 8D, 8E, 8F, 8G, 8H illustrate a series of exemplary operations associated with physical unit allocation, for use with embodiments of the present disclosure;

FIGS. 9A, 9B, 9C illustrate a series of exemplary operations associated with physical unit allocation, for use with embodiments of the present disclosure;

FIG. 10A is an exemplary interface for rendering a graphical representation of a physical space comprising a plurality of physical units for allocation, for use with embodiments of the present disclosure;

FIGS. 10B, 10C, 10D, 10E, 10G, 10H, and 10I illustrate a series of exemplary operations associated with physical unit allocation, for use with embodiments of the present disclosure;

FIGS. 10F and 10J are exemplary interfaces for rendering graphical representation of a physical space comprising a plurality of physical units that have been allocated, for use with embodiments of the present disclosure;

FIGS. 11A, 11B, 11C illustrate a series of exemplary operations associated with physical unit allocation, for use with embodiments of the present disclosure;

FIG. 12A is an exemplary multi-dimensional matrix representing a physical space comprising a plurality of physical units that have been allocated, for use with embodiments of the present disclosure;

FIG. 12B is an exemplary interface for rendering a graphical representation of a physical space comprising a plurality of physical units that have been allocated, for use with embodiments of the present disclosure;

FIG. 13A is an exemplary interface for rendering a graphical representation of a physical space comprising a plurality of physical units for allocation, for use with embodiments of the present disclosure;

FIGS. 13B, 13C, 13D, 13E, 13F, 13G, 13H illustrate a series of exemplary operations associated with physical unit allocation, for use with embodiments of the present disclosure;

FIGS. 14A, 14B, 14C, 14D, 14E illustrate a series of exemplary operations associated with physical unit allocation, for use with embodiments of the present disclosure;

FIG. 15A is an exemplary interface for rendering a graphical representation of a physical space comprising a plurality of physical units for allocation, for use with embodiments of the present disclosure;

FIG. 15B is an exemplary interface for rendering a graphical representation of a physical space comprising a plurality of physical units for allocation, for use with embodiments of the present disclosure;

FIG. 15C is an exemplary interface for rendering a graphical representation of a physical space comprising a plurality of physical units for allocation, for use with embodiments of the present disclosure;

FIG. 16A is an exemplary interface for rendering a graphical representation of a physical space comprising a plurality of physical units for allocation, for use with embodiments of the present disclosure;

FIG. 16B is an exemplary interface for rendering a graphical representation of a physical space comprising a plurality of physical units for allocation, for use with embodiments of the present disclosure; and FIGS. 17A and 17B illustrate exemplary operations associated with automatic allocation of physical units of a physical space, for use with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Embodiments of the present disclosure enforce a physical unit allocation regulation while providing flexibility in selecting physical units in dynamic quantities for any given event associated with a physical space housing the physical units. A safe seating selection for a party of N people may be defined as a particular subset of N physical units (e.g., seats) for N people such that all members of the party are directly or indirectly seated adjacent to each other but are not seated adjacent to (or within a defined distance of) any other person of another party. For example, a first group of four people may have seats allocated to them such that they are seated "together" (e.g., in four directly adjacent seats in a row, or grouped together with two directly adjacent seats in a first row and two directly adjacent seats in a second row adjacent the first row, either in front of or behind the first row). Accordingly, a second group of people will be seated such that they are all "together," but such that there is a safe minimum distance between the two groups of people (e.g., no one person from the first group of people will be seated adjacent any one person from the second group of people).

Embodiments of the present disclosure relate to generation of a unit allocation chart (e.g., a seating chart) for a given physical space (e.g., venue, arena, and the like). That is, embodiments of the present disclosure enable receipt of various metrics associated with a given physical space (e.g., number and arrangement of physical units, dimensions of physical units, other spatially related aspects of the physical space, and the like) and generation of an interface for rendering a graphical representation of the physical space. Embodiments of the present disclosure further transform a given physical space into an electronic multi-dimensional matrix representing the physical space and its associated various metrics. Advantageously, the multi-dimensional matrix representing the physical space (e.g., a seating chart) may be utilized for a wide variety of computational analyses, simulations, and allocation strategies. It will be appreciated that the analyses and allocation strategies described herein are not intended to limit the scope of the present disclosure.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, and the like.

The term "physical space identifier" refers to one or more items of data by which a physical space (e.g., venue, plane, train, bus) may be identified. For example, a physical space identifier may comprise ASCII text, a pointer, a memory address, and the like.

The term "interaction" refers to an identifiable, non-transitory occurrence that has technical significance for system hardware and/or software. An interaction may be user-generated, such as keystrokes or mouse movements, or system-generated, such as program loading and errors.

The term "physical space" refers to a physical location at which an event may take place. A physical space may be associated with a venue, an arena, a stadium, a transport vehicle (e.g., plane, train, bus), and the like. A physical space may have a plurality of physical units within it that may be allocated for occupancy by a physical being during an event.

The term "physical unit" refers to a subsection of a physical space that can be occupied by a physical being or that can be left unoccupied by physical beings during an event. Examples of physical units include seats and sections. A physical unit may be associated with one or more dimensions. The one or more dimensions may comprise one or more of a depth, a width, a height, or a space radius. A space radius may be a cushion of free space surrounding a physical unit.

The term "fixed arrangement" refers to an alterable or unalterable arrangement of physical units within a physical space. For example, physical units may be arranged according to a matrix of rows and columns or a semicircle, or other arrangement convenient for a particular event taking place at the physical space.

The term "allocation request" refers to one or more items of data received from a computing device representing a request for physical units of a physical space, usually for a particular event taking place at the physical space. The allocation request may comprise a physical unit quantity (e.g., a number of desired seats), a physical unit arrangement type, and an event identifier.

The term "event identifier" refers to one or more items of data by which an event may be identified. Examples of events include live or pre-recorded sporting events, live or pre-recorded performances, air flights, bus trips or train rides. An event identifier may be associated with an event data structure. An event data structure may comprise a plurality of data records each comprising items of data associated with an event identifier. Items of data associated with the event identifier may comprise a date, time, GPS coordinates, event participants, and the like. The event data structure may comprise an event configuration.

The term "physical unit arrangement type" refers to a requested arrangement of reserved physical units. The physical unit arrangement type may be one of straight line or cluster.

The term "physical unit allocation regulation" refers to a physical distance (among other possible measures) that is preferred to be maintained between human beings or groups of human beings. Examples of physical unit allocation regulations may include social distancing measures such as six feet during the COVID-19 pandemic. The physical unit allocation regulation may comprise a distance, and the distance specified may differ from time to time and from country to country. Various embodiments may implement physical unit allocation regulation by automatically positioning empty physical units or other known-empty areas adjacent to and/or surrounding physical units allocated for use. Accordingly, various embodiments may store data indicative of dimensions of each physical unit (e.g., a width, depth, height of a seat within an arena), such that the dimensions of each physical unit may be correlated with distances specified within physical unit allocation regulations. Similarly, dimensions of known non-occupied areas (e.g., aisles, restricted areas, and/or the like) within a physical space may be considered when determining an optimal allocation of physical units. As a non-limiting example, if a physical unit allocation regulation specifies a minimum distance of 6 feet between individuals associated with different groups, and a physical unit (e.g., seat) is known to have a width of 2.5 feet, then various embodiments may be configured to automatically place a buffer of unoccupied seats that is 3-physical units wide (correlating to a distance of 7.5 feet; the minimum possible distance between occupied physical units while satisfying the 6-foot minimum distance of the physical unit allocation regulation).

The term "possible physical unit allocation subset" refers to a plurality of physical units that represents a subset of available physical units that may be allocated in accordance with a given allocation request (among other constraints).

The term "physical unit allocation interface" refers to a collection of graphical interface elements for rendering a representation of physical units and/or a physical space comprising physical units for allocation. The physical unit allocation interface is configured for rendering via a display device of a computing device. The physical unit allocation interface may be configured in accordance with constraints associated with the display device of the computing device (e.g., a size of the display device, an operating system of the computing device, a resolution of the display device, and the like).

The term "unavailable physical unit" refers to a physical unit of a physical space that has been reserved for either physical use or to remain empty or unoccupied for a given event.

The term "available physical unit" refers to a physical unit of a physical space that has not yet been reserved for either physical use or to remain empty or unoccupied for a given event.

The term "physical space allocation interface" refers to a collection of graphical interface elements for rendering representations of a plurality of physical units associated with a given physical space. The physical space allocation interface may be associated with an event identifier. The physical space allocation interface may reflect a status of unavailable or available for each physical unit of the plurality of physical units represented by the interface. The physical space allocation interface may reflect a status of unavailable based on allocation for use by a physical being or unavailable based on allocation to remain unused by a physical being for those physical units associated with a status of unavailable.

The term "physical use" or "occupancy" refers to use by a physical being (e.g., a human being) such that the physical being may occupy the physical unit of the physical space for a duration of a given event.

The terms "unused," "empty," or "unoccupied" refer to a restriction placed on a physical unit of a physical space such that the physical unit must remain unused to provide a safe space surrounding other occupied physical units in its proximity and according to a physical unit allocation regulation.

The term "machine learning model" refers to a machine learning task. A machine learning model comprises a title and encompasses one or more target variables.

The term "target variable" refers to a value that a machine learning model is designed to predict. In the present embodiments, historical data is used to train a machine learning model (e.g., the event optimization model) to predict (e.g., score) the target variable (e.g., the physical unit score). Historical observations of the target variable are used for such training.

The term "physical unit score" refers to a value representing a desirability or viability of a particular physical unit for selection for allocation in response to a given allocation request. The physical unit score is generated based on a physical unit quantity and physical unit arrangement type of an allocation request. The event optimization model is trained to adjust (increase or decrease) a physical unit score for each available physical unit based on a desired physical unit allocation measure.

The term "desired physical unit allocation measure" refers to an optimization measure a physical unit owner may be interested in maximizing. The desired physical unit allocation measure may comprise a physical unit allocation utilization metric (e.g., to maximize utilization of the total physical units of a physical space) associated with the physical space identifier associated with a given event identifier. The desired physical unit allocation measure may comprise a physical unit allocation currency metric (e.g., to maximize a total revenue generated by allocation of the total physical units of a physical space) associated with the physical space identifier associated with a given event identifier.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a physical unit allocation system 103 via a communications network 102 using client devices 101A-101N. The physical unit allocation system 103 may comprise a physical unit allocation server 104 in communication with at least one repository 105 (e.g., physical unit allocation system 104 may comprise multiple repositories including a physical unit allocation repository and a physical space repository; alternatively repository 105 may comprise both a physical unit allocation repository and a physical space repository). It will be appreciated that, while references may be made herein to a physical space repository 105, repository 105 is not limited to such information.

Communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the physical unit allocation system. In some embodiments, the protocol is a custom protocol of JSON objects sent via a Websocket channel. In some embodiments, the protocol is JSON over RPC, JSON over REST/HTTP, and the like.

The physical unit allocation server 104 may be embodied as a computer or computers. The physical unit allocation server 104 may provide for receiving of electronic data from various sources, including but not necessarily limited to the client devices 101A-101N.

The repository 105 may be embodied as a data storage device such as a Network Attached Storage (NAS) device or devices, or as a separate database server or servers. The repository 105 includes information accessed and stored by the physical unit allocation server 104 to facilitate the operations of the physical unit allocation system 105. For example, the repository 105 may include, without limitation, a plurality of physical space identifiers, a plurality of physical unit allocation regulations associated with physical space identifiers, available and unavailable physical units for allocation associated with physical space identifiers, live event data structures, and the like.

The client devices 101A-101N may be a computing device as defined above. Electronic data received by the physical unit allocation server 104 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the physical unit allocation system 103. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the physical unit allocation system 103 via a web browser. As yet another example, the client device 101A-101N may include various hardware or firmware designed to interface with the physical unit allocation system 103.

Example Apparatus for Implementing Embodiments of the Present Disclosure

The physical unit allocation server 104 may be embodied by one or more computing systems, such as apparatus 200 shown in FIG. 2. The apparatus 200 may include a processor 202, a memory 201, input/output circuitry 203, communications circuitry 205, physical space/unit allocation repository 105 and physical unit allocation circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The physical unit allocation circuitry 204 includes hardware configured to support a physical unit allocation system. The physical unit allocation circuitry 204 may utilize processing circuitry, such as the processor 202, to perform these actions. The physical unit allocation circuitry 204 may send and/or receive data from physical space/unit allocation repository 105. It should also be appreciated that, in some embodiments, the physical unit allocation circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium

Example Processes for Automatic Unit Allocation Within A Physical Unit Allocation System Embodiments of the present disclosure enforce a physical unit allocation regulation while providing flexibility in selecting physical units in dynamic quantities for any given event associated with a physical space housing the physical units. A safe seating selection for a party of N people may be defined as a particular subset of N physical units (e.g., seats) for N people such that all members of the party are directly or indirectly seated adjacent to each other but are not seated adjacent to (or within a defined distance of) any other person of another party. Embodiments of the present disclosure enable interaction, by multiple client devices, with a physical unit allocation system, in order to select physical units for use in a physical space associated with a given event. It will be appreciated that, while a first client device may be in the process of selecting physical units for allocation within a particular physical space for a particular event, the physical unit allocation system may place a "lock" on certain physical units made available to the first client device for a given duration of network time in order to avoid allocation conflicts caused by other client devices requesting the same physical units for the same event at the same space. In embodiments, such locks may be dynamic based on their duration (e.g., 2 minutes, 5 minutes, etc.) as well as their reach (e.g., a block of seats, an entire section of seats, an entire arena).

FIG. 3 is an exemplary seat selection interface known in the art. Utilizing interfaces such as those depicted in FIG. 3, customers are able to select and purchase tickets for assigned seats during a performance, event, or even for travel (e.g., plane, train, bus). However, such existing interfaces result in customers being seated next to other unfamiliar customers and in too close of proximity in times of mandatory social distancing.

FIG. 4 is an exemplary physical space comprising a plurality of physical units for allocation, for use with embodiments of the present disclosure. FIG. 5 is an exemplary multi-dimensional matrix representing an exemplary physical space of FIG. 4 comprising a plurality of physical units for allocation, for use with embodiments of the present disclosure. In FIGS. 4 and 5, a physical space (e.g., a venue) comprises a plurality of physical units (e.g., seats) arranged in relation to one another according to a fixed arrangement. For example, the physical units (e.g., seats) are arranged among a plurality of rows (e.g., Row 1, Row 2, Row 3) with a front-most row (e.g., Row 1) arranged adjacent a front (e.g., Front) of the physical space and each row spanning from a first side (e.g., Left, or Aisle) to a second side (e.g., Right) of a section of the physical space. In FIG. 5, the physical space illustrated in FIG. 4 is represented as a two-dimensional matrix having a plurality of rows (e.g., Row 1, Row 2, Row 3) and a plurality of columns, where each physical unit (e.g., seat) is associated with a row-column pair. That is, a physical unit may be represented by a pair of identifiers comprising a first row identifier and a first column identifier.

FIG. 6A is an exemplary multi-dimensional matrix representing a physical space comprising a plurality of physical units for allocation, for use with embodiments of the present disclosure. In FIG. 6A, the multi-dimensional matrix represents a physical space that comprises a plurality of physical units (e.g., seats) arranged in relation to one another according to an alternative fixed arrangement. In such an alternative fixed arrangement, a given row (e.g., Row 1) of physical units (e.g., seats) is offset in relation to an adjacent row (e.g., Row 2) of physical units. An amount of offset or staggering may vary according to physical spaces and such variances are within the scope of the present disclosure.

FIG. 6B is an exemplary multi-dimensional matrix representing a physical space comprising a plurality of physical units for allocation, for use with embodiments of the present disclosure. In FIG. 6B, a given physical unit (e.g., unit A in Row 3) is associated with a plurality of adjacent physical units. That is, physical units B, C in adjacent row Row 4 may be considered adjacent physical units to physical unit A of FIG. 6B. Physical units D, E (on either side of physical unit A) in the same row Row 3 as physical unit A may be considered adjacent physical units to physical unit A of FIG. 6B. Physical units F, G in adjacent row Row 2 may be considered adjacent physical units to physical unit A of FIG. 6B. In an example physical space associated with a given physical unit allocation regulation, if adjacent physical units B, C, D, E, F, and G of FIG. 6B provide enough unused physical space, then adjacent physical units B, C, D, E, F, and G of FIG. 6B may be transformed to unavailable based upon physical unit A being allocated as unavailable for use by a physical being.

FIG. 7A is an exemplary multi-dimensional matrix representing a physical space comprising a plurality of physical units for allocation, for use with embodiments of the present disclosure. In FIG. 7A, the multi-dimensional matrix represents a physical space that comprises a plurality of physical units (e.g., seats) arranged in relation to one another according to yet another alternative fixed arrangement. In such an alternative fixed arrangement, a given row (e.g., Row 2) of physical units (e.g., seats) is curved in related to adjacent rows (e.g., Row 1, and Row 3) of physical units as well as in relation to a front (e.g., Front) of the physical space (e.g., venue). A curvature may vary according to physical spaces and such variances are within the scope of the present disclosure.

FIG. 7B is an exemplary multi-dimensional matrix representing a physical space comprising a plurality of physical units for allocation, for use with embodiments of the present disclosure. In FIG. 7B, a given physical unit (e.g., unit A in Row 3) is associated with a plurality of adjacent physical units. That is, physical unit B in adjacent row Row 4 may be considered an adjacent physical unit to physical unit A of FIG. 7B. Physical units C, D (on either side of physical unit A) in the same row Row 3 as physical unit A may be considered adjacent physical units to physical unit A of FIG. 7B. Physical units E, F in adjacent row Row 2 may be considered adjacent physical units to physical unit A of FIG. 7B. In an example physical space associated with a given physical unit allocation regulation, if adjacent physical units B, C, D, E, and F of FIG. 7B provide enough unused physical space, then adjacent physical units B, C, D, E, and F of FIG. 7B may be transformed to unavailable based upon physical unit A being allocated as unavailable for use by a physical being.

Figure 8A:
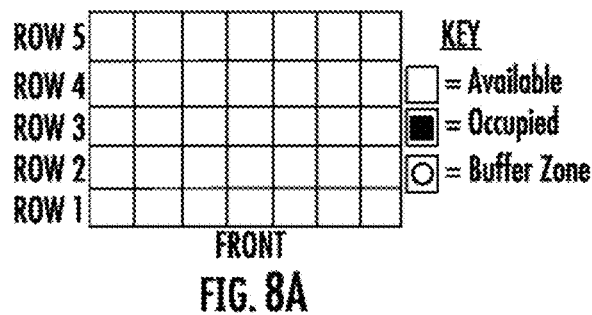

FIGS. 8A, 8B, 8C, 8D, 8E, 8F, 8G, 8H illustrate a series of exemplary operations associated with physical unit allocation, for use with embodiments of the present disclosure. FIG. 8A illustrates an exemplary multi-dimensional matrix representing a physical space (e.g., a venue) comprising a plurality of physical units arranged in a plurality of rows (e.g., Row 1, Row 2, Row 3, Row 4, Row 5) and a plurality of columns. Each physical unit is associated with a row-column pair, such that the physical unit is associated with a given row identifier and a given column identifier.

Figure 8E:
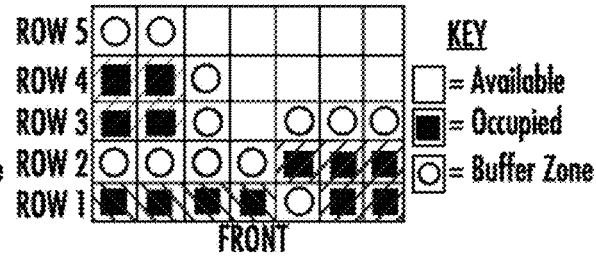
Figure 8B:
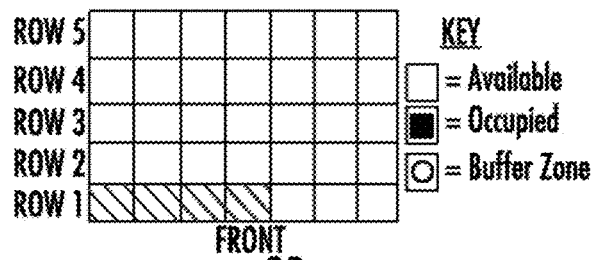

In FIG. 8B, after having received an allocation request comprising a physical unit quantity (e.g., here, the quantity is four (4)), a plurality of physical units (e.g., four physical units in the first row Row 1, starting from the far left of the section of the physical space) may be allocated for use by each physical being of a plurality (e.g., 4) of physical beings.

Figure 8F:
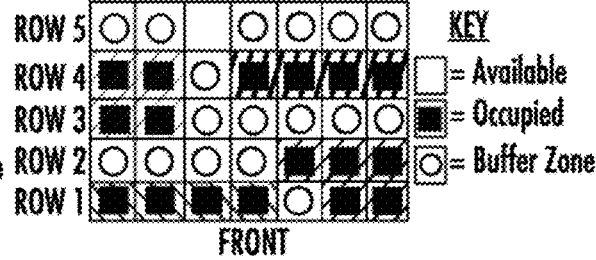
Figure 8C:
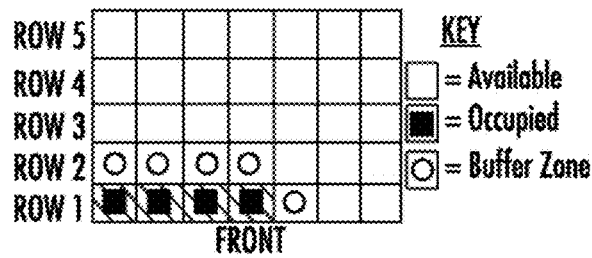

In FIG. 8C, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units in Row 2 and the direct adjacent physical unit on an unallocated side of a farthest allocated physical unit in Row 1) may be allocated to remain empty (e.g., referred to as buffer zone in the figure) in accordance with a physical unit allocation regulation associated with the physical space depicted in the figure.

Figure 8G:
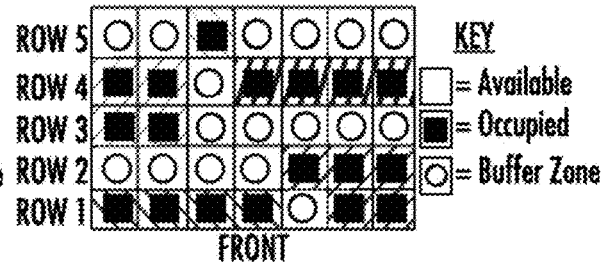
Figure 8D:
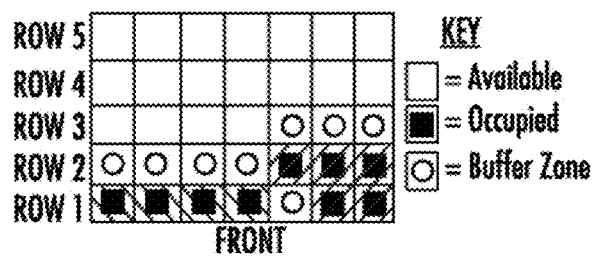

In FIG. 8D, after having received a subsequent allocation request comprising a physical unit quantity (e.g., here, the quantity is five (5)), a plurality of physical units (e.g., the remaining two unallocated physical units in the first row Row 1, starting from the far right of the section of the physical space as well as the three direct adjacent physical units in Row 2 behind those selected in Row 1) may be allocated for use by each physical being of a plurality (e.g., 5) of physical beings. Further in FIG. 8D, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units in Row 3 may be allocated to remain empty in accordance with a physical unit allocation regulation associated with the physical space depicted in the figure.

In FIG. 8E, after having received a subsequent allocation request comprising a physical unit quantity (e.g., here, the quantity is four (4)), a plurality of physical units (e.g., a block of two unallocated physical units in Row 3 behind the "empty" seats in Row 2 and a block of two unallocated physical units in Row 4 behind the selected seats in Row 3) may be allocated for use by each physical being of a plurality (e.g., 4) of physical beings. Further in FIG. 8E, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units in Rows 3 and 4 and the direct adjacent physical units in Row 5) may be allocated to remain empty (e.g., referred to as buffer zone in the figure) in accordance with a physical unit allocation regulation associated with the physical space depicted in the figure.

In FIG. 8F, after having received a subsequent allocation request comprising a physical unit quantity (e.g., here, the quantity is four (4)), a plurality of physical units (e.g., a block of four unallocated physical units in Row 4 starting from the far right of the physical space) may be allocated for use by each physical being of a plurality (e.g., 4) of physical beings. Further in FIG. 8F, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units in Row 5) may be allocated to remain empty (e.g., referred to as buffer zone in the figure) in accordance with a physical unit allocation regulation associated with the physical space depicted in the figure.

In FIG. 8G, a subsequent allocation request comprising a physical unit quantity may be fulfilled using the remaining unallocated physical unit of the physical space in Row 5. FIG. 8G ultimately represents an exemplary fully allocated physical space in accordance with a physical unit allocation regulation which dictates a minimum amount of empty space (e.g., distance) between physical beings within a physical space (e.g., venue).

Figure 8H:
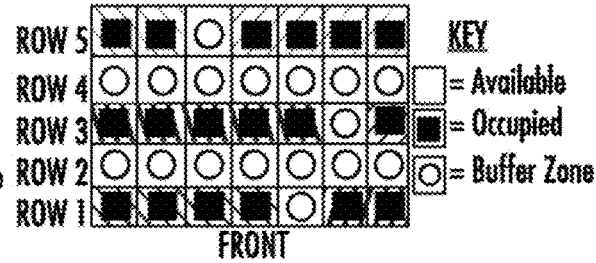

FIG. 8H represents an alternative exemplary full allocation of the physical space in accordance with a physical unit allocation regulation which dictates a minimum amount of empty space (e.g., distance) between physical beings within a physical space (e.g., venue).

FIGS. 9A, 9B, 9C illustrate a series of exemplary operations associated with physical unit allocation, for use with embodiments of the present disclosure. FIG. 9A illustrates an exemplary multi-dimensional matrix representing a physical space (e.g., a venue) comprising a plurality of physical units arranged in a plurality of rows (e.g., Row 1, Row 2, Row 3, Row 4, Row 5) and a plurality of columns. Each physical unit is associated with a row-column pair, such that the physical unit is associated with a given row identifier and a given column identifier.

In FIG. 9B, after having received an allocation request comprising a physical unit quantity (e.g., here, the quantity is four (4)), a plurality of physical units (e.g., two physical units in the first row Row 1, starting from the far left of the section of the physical space, and two physical units in Row 2 behind those selected from Row 1) may be allocated for use by each physical being of a plurality (e.g., 4) of physical beings.

In FIG. 9C, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units on a farthest allocated physical unit in Rows 1 and 2 and the direct adjacent physical units in Row 3) may be allocated to remain empty (e.g., referred to as buffer zone in the figure) in accordance with a physical unit allocation regulation associated with the physical space depicted in the figure. Further, FIG. 9C illustrates an alternative exemplary full allocation of the physical space in accordance with a physical unit allocation regulation which dictates a minimum amount of empty space (e.g., distance) between physical beings within a physical space (e.g., venue).

FIG. 10A is an exemplary interface for rendering graphical representation of a physical space comprising a plurality of physical units for allocation, for use with embodiments of the present disclosure. Embodiments of the present disclosure enable provision, via a user interface, of various metrics associated with a physical space, and generation of an interface for rendering a graphical representation of the physical space based on the various metrics. Such a graphical representation may comprise the physical space without any physical units allocated (e.g., an empty seating chart). In alternative embodiments, the graphical representation may be dynamically updated as physical units are allocated such that the physical space representation reflects allocation of some or all of its associated physical units.

In FIG. 10A, the exemplary interface comprises graphical representation of a plurality of physical units 1002 as part of a physical space (e.g., a venue) arranged in a plurality of rows. The exemplary interface may further comprise a selection pane 1003 whereby selections including distances between allocated physical units may be provided, as well as a physical unit allocation quantity, and a physical unit arrangement type (e.g., mixed or fill mode).

FIG. 10B illustrates the physical space depicted in FIG. 10A transformed into a multi-dimensional matrix comprising a plurality of physical units arranged among a plurality of rows.

In FIG. 10C, after having received an allocation request comprising a physical unit quantity (e.g., here, the quantity is four (4)), a plurality of physical units (e.g., four physical units 1, 2, 3, 4, in the first row Row 1, starting from the far left of the section of the physical space) may be allocated for use by each physical being of a plurality (e.g., 4) of physical beings.

In FIG. 10D, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units 1, 2, 3, 4, 5 in Row 2 and the direct adjacent physical unit 5 on an unallocated side of a farthest allocated physical unit in Row 1) may be allocated to remain empty in accordance with a physical unit allocation regulation associated with the physical space depicted in the figure.

In FIG. 10E, the physical units 1, 2, 3, 4 in Row 1 are transformed from available physical units to unavailable physical units in a repository associated with the physical space depicted in the figure. The physical unit 5 in Row 1 as well as physical units 1, 2, 3, 4, 5 in Row 2 are transformed from available to unavailable physical units in the repository associated with the physical space. The physical units 1, 2, 3, 4 in Row 1 are unavailable for the purpose of being reserved for use or occupancy by a physical being. The physical unit 5 in Row 1 as well as physical units 1, 2, 3, 4, 5 in Row 2 are unavailable for the purpose reserved for being unused or unoccupied by physical beings in accordance with a physical unit allocation regulation associated with the physical space depicted in the figure. FIG. 10F illustrates an exemplary interface for rendering a graphical representation of the resulting allocated units in the physical space.

In FIG. 10G, after having received a subsequent allocation request comprising a physical unit quantity (e.g., here, the quantity is four (4)), a plurality of physical units (e.g., two physical units 9, 10 in Row 1 and two physical units 10, 11 in Row 2, starting from the far right of the section of the physical space) may be allocated for use by each physical being of a plurality (e.g., 4) of physical beings.

In FIG. 10H, after having received confirmation that the allocation of the plurality of physical units is acceptable (e.g., by way of user interface interaction signals received from a requesting computing device or by internal confirmation by the physical unit allocation system), a plurality of adjacent physical units (e.g., the direct adjacent physical units 8 in Row 1, 9 in Row 2, and 10, 11, 12 in Row 3) may be allocated to remain empty in accordance with a physical unit allocation regulation associated with the physical space depicted in the figure.

In FIG. 10I, the physical units 9, 10 in Row 1 and 10, 11 in Row 2 are transformed from available physical units to unavailable physical units in a repository associated with the physical space depicted in the figure. The physical unit 8 in Row 1 as well as physical unit 9 in Row 2 and physical units 10, 11, 12 in Row 3 are transformed from available to unavailable physical units in the repository associated with the physical space. The physical units 9, 10 in Row 1 and 10, 11 in Row 2 are unavailable for the purpose of being reserved for use or occupancy by a physical being. The physical unit 8 in Row 1 as well as physical unit 9 in Row 2 and physical units 10, 11, 12 in Row 3 are unavailable for the purpose reserved for being unused or unoccupied by physical beings in accordance with a physical unit allocation regulation associated with the physical space depicted in the figure. FIG. 10J illustrates an exemplary interface for rendering a graphical representation of the resulting allocated units in the physical space.

FIGS. 11A, 11B, 11C illustrate a series of exemplary operations associated with physical unit allocation, for use with embodiments of the present disclosure. FIGS. 11A, 11B, and 11C illustrate alternative allocations of physical units for occupancy by physical beings as well as those reserved to be left unoccupied in accordance with a physical unit allocation regulation associated with the physical space depicted in the figure.

FIG. 12A is an exemplary multi-dimensional matrix representing a physical space comprising a plurality of physical units that have been allocated, for use with embodiments of the present disclosure. FIG. 12B is an exemplary interface for rendering graphical representation of the physical space of FIG. 12A comprising a plurality of physical units that have been allocated, for use with embodiments of the present disclosure.

FIG. 13A is an exemplary interface for rendering graphical representation of a physical space comprising a plurality of physical units for allocation, for use with embodiments of the present disclosure. FIGS. 13B, 13C, 13D, 13E, 13F, 13G, 13H illustrate a series of exemplary operations associated with an alternative physical unit allocation, for use with embodiments of the present disclosure.

FIGS. 14A, 14B, 14C, 14D, 14E illustrate a series of exemplary operations associated with an alternative physical unit allocation, for use with embodiments of the present disclosure.

FIG. 15A is an exemplary interface for rendering graphical representation of a physical space comprising a plurality of physical units allocated according to an alternative allocation, for use with embodiments of the present disclosure. FIG. 15B is an exemplary interface for rendering graphical representation of a physical space comprising a plurality of physical units allocated according to an alternative, for use with embodiments of the present disclosure. FIG. 15C is an exemplary interface for rendering graphical representation of a physical space comprising a plurality of physical units allocated according to an alternative, for use with embodiments of the present disclosure.

FIG. 16A is an exemplary interface for rendering graphical representation of a physical space (e.g., venue) comprising a plurality of physical units for allocation, for use with embodiments of the present disclosure. FIG. 16B is an exemplary interface for rendering graphical representation of a physical space (e.g., venue) comprising a plurality of physical units for allocation, for use with embodiments of the present disclosure.

FIGS. 17A and 17B illustrate exemplary operations associated with automatic allocation of physical units of a physical space, for use with embodiments of the present disclosure. In embodiments, the exemplary operations 1700 illustrated in FIGS. 17A and 17B may be performed using one or more physical unit allocation servers 104 as discussed above.

In embodiments, an allocation request is received 1702 from a first computing device (e.g., 101A-101N). The allocation request may comprise a physical space identifier, a physical unit quantity, and a physical unit arrangement type. The physical unit arrangement type may be one or more of straight line or cluster.

A plurality of possible physical unit allocation subsets matching the allocation request is retrieved 1704 from a physical space repository (e.g., 105) and based on a physical unit allocation regulation associated with the physical space identifier.

A physical unit allocation interface comprising one or more possible physical unit allocation subsets of the plurality of possible physical unit allocation subsets is transmitted 1706 to the first computing device.

Available physical units associated with the physical space identifier are transformed 1708, in the physical space repository and based on a physical unit allocation subset selection received from the first computing device, to unavailable physical units.

In embodiments, the unavailable physical units comprise first physical units allocated for physical use by a physical being as well as second physical units allocated to remain unused by physical beings according to the physical unit allocation regulation.

The physical unit allocation regulation may comprise a distance. The one or more dimensions comprise one or more of a depth, a width, a height, or a space radius.

A physical unit may comprise one or more dimensions. In embodiments, the second physical units to remain unused by physical beings are selected by selecting a number of physical units adjacent one or more of the first physical units allocated for physical use by a physical being based at least in part on a comparison of one or more dimensions of the physical units and the distance of the physical unit allocation regulation.

In embodiments, the allocation request comprises an event identifier. In embodiments, an event data structure associated with the event identifier is retrieved 1703. In embodiments, the plurality of possible physical unit allocation subsets is associated with the event identifier.

In embodiments, the unavailable physical units are associated with the event identifier. In embodiments, one or more of the first computing device or a second computing device, may provide a modification to the physical unit allocation regulation.

In embodiments, the event identifier is associated with an event configuration. The plurality of possible physical unit allocation subsets may be selected in accordance with the event configuration.

In embodiments, the event identifier is associated with an event optimization model. In embodiments, the plurality of possible physical unit allocation subsets is selected 1704A in accordance with the event optimization model. That is, the plurality of possible physical unit allocation subsets is pruned or reduced in accordance with the event optimization model. In embodiments, the event optimization model dynamically programmatically generates a physical unit score for each available physical unit in accordance with the physical unit quantity and physical unit arrangement type of the allocation request. In embodiments, the event optimization model is trained to adjust a physical unit score for each available physical unit based on a desired physical unit allocation measure.

In embodiments, the desired physical unit allocation measure comprises a physical unit allocation utilization metric associated with the physical space identifier associated with a given event identifier. For example, a given physical space identifier hosting a given event associated with a given event identifier may be associated with a target physical unit allocation utilization (e.g., seat utilization) such that an overall utilization associated with the event identifier is maximized while enforcing the physical unit allocation regulation. In such an example, the event optimization model may dynamically adjust a physical unit score and/or a currency metric (e.g., seat price) associated with a physical unit in order to meet the target physical unit allocation utilization for the physical space identifier and event identifier combination.

In embodiments, the desired physical unit allocation measure comprises a physical unit allocation currency metric associated with the physical space identifier associated with a given event identifier. For example, a given physical space identifier hosting a given event associated with a given event identifier may be associated with a target average per physical unit currency (e.g., average seat price) such that an overall currency associated with the event identifier is maximized while enforcing the physical unit allocation regulation. In such an example, the event optimization model may dynamically adjust a physical unit score and/or a currency metric (e.g., seat price) associated with a physical unit in order to meet the physical unit allocation currency metric goal for the physical space identifier and event identifier combination.

In embodiments, while one or more physical units may have been allocated and identified as unavailable in the repository based on an initial interaction with a first client device, the one or more physical units may be transferred from a user associated with the first client device to one or more other users associated with other client devices. In such scenarios, a given plurality of physical units (e.g., 4 seats) may need to be broken up into a subset of the plurality of physical units (e.g., 2 sets of 2 seats) for the purposes of the transfer (e.g., ticket resale). Embodiments of the present disclosure may either prevent division of the given plurality of physical units (e.g., the 4 seats remain a block for transfer altogether) to maintain enforcement of the physical unit allocation regulation. Alternatively, embodiments of the present disclosure may divide a previously allocated plurality of physical units into one or more subsets of physical units by transforming the allocated physical units (e.g., unavailable physical units) to available physical units in the repository such that they are available for subsequent presentation in response to subsequent allocation requests (e.g., the seats are deposited back into the general pool for general availability). In such embodiments, adjacent physical units that had been transformed to unavailable in the repository for the purposes of remaining unoccupied and enforcing a physical unit allocation regulation associated with the previously allocation physical units for occupancy are transformed to available to the extent they are not required to maintain a required distance associated with other allocated physical units.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for dynamically allocating graphical seating units within an interactive graphical representation of a seating map for a venue, the method comprising:
   causing display of an interactive seating unit allocation interface comprising an interactive seating map for a venue at a first computing device, wherein the interactive seating map identifies available seating units and unavailable seating units, wherein the unavailable seating units comprise reserved seating units and buffer seating units associated with the venue based at least in part on data stored within a seating space repository;
   receiving, from the first computing device and based on user input received by the interactive seating unit allocation interface, an allocation request requesting selection of one or more seating units of the available seating units reflected within the interactive seating map for the venue;
   determining, based at least in part on the data stored within the seating space repository and based at least in part on enforcing a physical unit allocation algorithm associated with the venue, a seating unit allocation associated with the first computing device, wherein the seating unit allocation comprises a first grouping of seating units corresponding to the one or more seating units selected within the allocation request and a second grouping of seating units adjacent to at least one of the one or more seating units within the first grouping of seating units, wherein the second grouping of seating units reflects buffer seats, wherein the second grouping of seating units are automatically positioned as buffer seats in response to the one or more seating units selected within the allocation request, and wherein the physical unit allocation algorithm comprises a physical distance to be maintained between human beings or groups of human beings;
   locking, within the seating space repository, the first grouping of seating units and the second grouping of seating units based at least in part on the allocation request;
   receiving, from the first computing device, confirmation data associated with the allocation request; and
   transforming, in the seating space repository, the first grouping of seating units from available seating units to reserved seating units and the second grouping of seating units from available seating units to buffer seating units according to the enforcing of the physical unit allocation algorithm.

2. The computer-implemented method of claim 1, wherein the first grouping of seating units and the second grouping of seating units are within a single row displayed within the interactive seating map.

3. The computer-implemented method of claim 1, wherein locking the first grouping of seating units and the second grouping of seating units comprises temporarily locking the first grouping of seating units and the second grouping of seating units during a defined duration of time.

4. The computer-implemented method of claim 1, wherein the physical unit allocation algorithm defines one or more of a number of empty physical seating units or known empty areas adjacent to or surrounding reserved seating units.

5. The computer-implemented method of claim 4, wherein the physical unit allocation algorithm indicates one or more of at least two buffer seating units or a number of buffer seating units known to have combined dimensions adding up to the physical distance to be positioned adjacent a reserved seating unit.

6. The computer-implemented method of claim 1, further comprising:
   receiving, from a second computing device, a second allocation request requesting selection of one or more seating units of the first grouping of seating units or the second grouping of seating units while the first grouping of seating units and the second grouping of seating units are locked; and preventing generation of a lock associated with the second allocation request associated with the second computing device.

7. The computer-implemented method of claim 1, wherein the interactive seating unit allocation interface comprises, within the interactive seating map, a first seating unit identifier associated with available seating units, a second seating unit identifier associated with reserved seating units, and third seating unit identifier associated with the buffer seating units.

8. An apparatus for dynamically allocating graphical seating units within an interactive graphical representation of a seating map for a venue, the apparatus comprising one or more memory storage areas and one or more processors, wherein the one or more processors are collectively configured to:

cause display of an interactive seating unit allocation interface comprising an interactive seating map for a venue at a first computing device, wherein the interactive seating map identifies available seating units and unavailable seating units, wherein the unavailable seating units comprise reserved seating units and buffer seating units associated with the venue based at least in part on data stored within a seating space repository;

receive, from the first computing device and based on user input received by the interactive seating unit allocation interface, an allocation request requesting selection of one or more seating units of the available seating units reflected within the interactive seating map for the venue;

determine, based at least in part on the data stored within the seating space repository and based at least in part on enforcing a physical unit allocation algorithm associated with the venue, a seating unit allocation associated with the first computing device, wherein the seating unit allocation comprises a first grouping of seating units corresponding to the one or more seating units selected within the allocation request and a second grouping of seating units adjacent to at least one of the one or more seating units within the first grouping of seating units, wherein the second grouping of seating units reflects buffer seats, wherein the second grouping of seating units are automatically positioned as buffer seats in response to the one or more seating units selected within the allocation request, and wherein the physical unit allocation algorithm comprises a physical distance to be maintained between human beings or groups of human beings;

lock, within the seating space repository, the first grouping of seating units and the second grouping of seating units based at least in part on the allocation request;

receive, from the first computing device, confirmation data associated with the allocation request; and transform, in the seating space repository, the first grouping of seating units from available seating units to reserved seating units and the second grouping of seating units from available seating units to buffer seating units according to the physical unit allocation algorithm.

9. The apparatus of claim 8, wherein the first grouping of seating units and the second grouping of seating units are within a single row displayed within the interactive seating map.

10. The apparatus of claim 8, wherein locking the first grouping of seating units and the second grouping of seating units comprises temporarily locking the first grouping of seating units and the second grouping of seating units during a defined duration of time.

11. The apparatus of claim 8, wherein the physical unit allocation algorithm defines one or more of a number of empty physical seating units or known empty areas adjacent to or surrounding reserved seating units.

12. The apparatus of claim 11, wherein the physical unit allocation algorithm indicates one or more of at least two buffer seating units or a number of buffer seating units known to have combined dimensions adding up to the physical distance to be positioned adjacent a reserved seating unit.

13. The apparatus of claim 8, wherein the one or more processors are further configured to:

receive, from a second computing device, a second allocation request requesting selection of one or more seating units of the first grouping of seating units or the second grouping of seating units while the first grouping of seating units and the second grouping of seating units are locked; and prevent generation of a lock associated with the second allocation request associated with the second computing device.

14. The apparatus of claim 8, wherein the interactive seating unit allocation interface comprises, within the interactive seating map, a first seating unit identifier associated with available seating units, a second seating unit identifier associated with reserved seating units, and third seating unit identifier associated with the buffer seating units.

15. A computer program product comprising at least one non-transitory computer readable storage medium storing instructions that, with a processor, cause an apparatus to:

cause display of an interactive seating unit allocation interface comprising an interactive seating map for a venue at a first computing device, wherein the interactive seating map identifies available seating units and unavailable seating units, wherein the unavailable seating units comprise reserved seating units and buffer seating units associated with the venue based at least in part on data stored within a seating space repository;

receive, from the first computing device and based on user input received by the interactive seating unit allocation interface, an allocation request requesting selection of one or more seating units of the available seating units reflected within the interactive seating map for the venue;

determine, based at least in part on the data stored within the seating space repository and based at least in part on enforcing a physical unit allocation algorithm associated with the venue, a seating unit allocation associated with the first computing device, wherein the seating unit allocation comprises a first grouping of seating units corresponding to the one or more seating units selected within the allocation request and a second grouping of seating units adjacent to at least one of the one or more seating units within the first grouping of seating units, wherein the second grouping of seating units reflects buffer seats, wherein the second grouping of seating units are automatically positioned as buffer seats in response to the one or more seating units selected within the allocation request, and wherein the physical unit allocation algorithm comprises a physical distance to be maintained between human beings or groups of human beings;

lock, within the seating space repository, the first grouping of seating units and the second grouping of seating units based at least in part on the allocation request;

receive, from the first computing device, confirmation data associated with the allocation request; and transform, in the seating space repository, the first grouping of seating units from available seating units to reserved seating units and the second grouping of seating units from available seating units to buffer seating units according to the physical unit allocation algorithm.

16. The computer program product of claim 15, wherein the first grouping of seating units and the second grouping of seating units are within a single row displayed within the interactive seating map.

17. The computer program product of claim 15, wherein locking the first grouping of seating units and the second grouping of seating units comprises temporarily locking the first grouping of seating units and the second grouping of seating units during a defined duration of time.

18. The computer program product of claim 15, wherein the physical unit allocation algorithm defines one or more of a number of empty physical seating units or known empty areas adjacent to or surrounding reserved seating units.

19. The computer program product of claim 18, wherein the one or more processors are further configured to:

receive, from a second computing device, a second allocation request requesting selection of one or more seating units of the first grouping of seating units or the second grouping of seating units while the first grouping of seating units and the second grouping of seating units are locked; and prevent generation of a lock associated with the second allocation request associated with the second computing device.

20. The computer program product of claim 15, wherein the interactive seating unit allocation interface comprises, within the interactive seating map, a first seating unit identifier associated with available seating units, a second seating unit identifier associated with reserved seating units, and third seating unit identifier associated with the buffer seating units.

* * * * *